United States Patent
London et al.

(10) Patent No.: US 10,333,747 B2
(45) Date of Patent: Jun. 25, 2019

(54) INCLUSIVE MODELING AND DIGITAL COMPENSATION FOR COUPLING IMPAIRMENTS OF HIGH-SPEED COUPLED ELECTRICAL MICROSTRIP TRACES IN DATA CENTER CONNECTIONS

(71) Applicant: B. G. NEGEV TECHNOLOGIES AND APPLICATIONS LTD., AT BEN-GURION UNIVERSITY, Beer Sheva (IL)

(72) Inventors: Yanir London, Pardes Hanna-Karkur (IL); Dan Sadot, Kfar Bilu (IL)

(73) Assignee: B.G. Negev Technologies and Applications Ltd., at Ben-Gurion University, Beer Sheva (IL)

( * ) Notice: Subject to any disclaimer, the term of this patent is extended or adjusted under 35 U.S.C. 154(b) by 0 days.

(21) Appl. No.: 15/684,184

(22) Filed: Aug. 23, 2017

(65) Prior Publication Data

US 2018/0062885 A1     Mar. 1, 2018

Related U.S. Application Data

(60) Provisional application No. 62/378,700, filed on Aug. 24, 2016.

(51) Int. Cl.
| | |
|---|---|
| *H04L 25/03* | (2006.01) |
| *H04B 10/27* | (2013.01) |
| *H04L 25/02* | (2006.01) |
| *H04B 10/50* | (2013.01) |
| *H04B 10/40* | (2013.01) |

(52) U.S. Cl.
CPC ....... *H04L 25/03885* (2013.01); *H04B 10/27* (2013.01); *H04B 10/501* (2013.01); *H04L 25/0272* (2013.01); *H04B 10/40* (2013.01)

(58) Field of Classification Search
CPC .......... H04L 25/03885; H04L 25/0272; H04B 10/27
See application file for complete search history.

(56) References Cited

U.S. PATENT DOCUMENTS

| | | | | |
|---|---|---|---|---|
| 2002/0122503 A1* | 9/2002 | Agazzi | ................ | H03M 1/0624 375/316 |
| 2003/0182619 A1* | 9/2003 | Greiss | .................. | H04B 1/0003 714/798 |

OTHER PUBLICATIONS

F. D. Mbairi, W. P. Siebert, and H. Hesselbom, "High-Frequency Transmission Lines Crosstalk Reduction Using Spacing Rules," IEEE Transactions on Components and Packaging Technologies, vol. 31, No. 3, pp. 601-610, Sep. 2008. (10 pages).

(Continued)

*Primary Examiner* — David S Huang
(74) *Attorney, Agent, or Firm* — Roach Brown McCarthy & Gruber, P.C.; Kevin D. McCarthy

(57) ABSTRACT

Disclosed is a method of compensating for coupling impairments in optical communication systems comprising two or more coupled transmission lines. The method comprises introducing into the system a component comprising an electronic circuit configured to realize at least one of an exact electrical coupling compensation (EECC) algorithm and a spectrally fragmented electrical coupling compensation (SF-ECC) algorithm.

14 Claims, 8 Drawing Sheets

(56) References Cited

OTHER PUBLICATIONS

K. Prachumrasee, A. Kaewrawang, A. Kruesubthaworn, R. Sivaratana, and A. Siritaratiwat, "Crosstalk Suppression in High Data Rate and High Density Hard Disk Drive Interconnects Using Magnetic Composites," Frequenz, vol. 67, No. 7-8, Jan. 2013. (6 pages).

T. Oh and R. Harjani, "A 12-Gb/s Multichannel I/O Using MIMO Crosstalk Cancellation and Signal Reutilization in 65-nm CMOS," IEEE Journal of Solid-State Circuits, vol. 48, No. 6, pp. 1383-1397, Jun. 2013 (15 pages).

C. Pelard et al., "Realization of multigigabit channel equalization and crosstalk cancellation integrated circuits," in IEEE Journal of Solid-State Circuits, vol. 39, No. 10, pp. 1659-1670, Oct. 2004. (12 pages).

S.Y. Kao and S.-I. Liu, "A 10-Gb/s Adaptive Parallel Receiver With Joint XTC and DFE Using Power Detection," IEEE Journal of Solid-State Circuits, vol. 48, No. 11, pp. 2815-2826, Nov. 2013 (12 pages).

J. Han and M. M. Green, "A 2 × 50-Gb/s receiver with adaptive channel loss equalization and far-end crosstalk cancellation," 2015, pp. 2397-2400 (4 pages).

R. Mongia, I. J. Bahl, P. Bhartia, and J. Hong, RF and microwave coupled-line circuits, 2nd ed. Boston: Artech House, 2007 (115 pages).

D. M. Pozar, Microwave engineering, 4th ed. Hoboken, NJ: Wiley, 2012; pp. 147-153; 178-181; and 347-351 (19 pages).

G. P. Agrawal, Nonlinear fiber optics, Fourth edition. Amsterdam: Elsevier/Academic Press, 2007, pp. 8-13, 213-215, 376 (12 pages).

D. Penninckx and V. Morénas, "Jones matrix of polarization mode dispersion," Optics Letters, vol. 24, No. 13, p. 875, Jul. 1999 (3 pages).

H. A. Atwater, "Tests of microstrip dispersion formulas," IEEE Transactions on Microwave Theory and Techniques, vol. 36, No. 3, pp. 619-621, Mar. 1988 (3 pages).

Y. London and D. Sadot, "Spectrally Fragmented Electrical Dispersion Compensation for High-Speed Microstrip Traces in Data Centers Connections," in IEEE Photonics Journal, vol. 8, No. 2, pp. 1-12, Apr. 2016 (13 pages).

M. Kirschning and R. H. Jansen, "Accurate Wide-Range Design Equations for the Frequency-Dependent Characteristic of Parallel Coupled Microstrip Lines," IEEE Transactions on Microwave Theory and Techniques, vol. 32, No. 1, pp. 83-90, Jan. 1984 (8 pages).

R. Mellitz and K. Lusted, "100Gb/s Backplane/PCB Ethernet Two Channel Model and Two PHY Proposal," Proc. IEEE P802.3bj TF, Jan. 2012 (15 pages).

A. C. Scogna, "Signal integrity analysis of a 26 layers board with emphasis on the effect of non-functional pads," in Proc. of IEEE Int. Symposium on EMC, Aug. 2008 (6 pages).

T. Oh and R. Harjani, "A 6-Gb/s MIMO Crosstalk Cancellation Scheme for High-Speed I/Os," IEEE Journal of Solid-State Circuits, vol. 46, No. 8, pp. 1843-1856, Aug. 2011 (14 pages).

Y. London and D. Sadot, "Digital Compensation for Coupling Impairments of Coupled Traces in 100G PAM4 Data Center Connections," in Proc. SPPCom 2, OSA Technical Digest (online) (Optical Society of America, 2016), paper SpM2E.7 (3 pages).

Y. London and D. Sadot, "Inclusive Modeling and Digital Compensation for Coupling Impairments of High-Speed Coupled Electrical Microstrip Traces in 100G OOK and PAM4 Data Center Connections," in Journal of Lightwave Technology, vol. 34, No. 23, pp. 5474-5484, Dec. 1, 1 2016, doi: 10.1109/JLT.2016.2602881 (11 pages).

\* cited by examiner

INCLUSIVE MODELING AND DIGITAL COMPENSATION FOR COUPLING IMPAIRMENTS OF HIGH-SPEED COUPLED ELECTRICAL MICROSTRIP TRACES IN DATA CENTER CONNECTIONS

FIELD OF THE INVENTION

The invention is from the field of systems comprising coupled transmission lines. Specifically the invention is related to the field of coupled transmission lines that experience coupling impairments that require compensation.

BACKGROUND OF THE INVENTION

Publications and other reference materials referred to herein are numerically referenced in the following text and respectively grouped in the appended Bibliography which immediately precedes the claims.

The increased data capacity in cloud servers requires reliable transmission at the highest available data rate. Therefore, optical communication between the server units is used due its high data rate transmission capabilities. In order to fit the aggressive low cost requirements of data centers, the next generation transceivers are based on commercially available 25G direct detection components combined with state-of-the-art communication and digital signal processing (DSP) techniques. Currently, 100G data center transceivers include a hybrid optical-electrical module packaged in a single pluggable form-factor. However, the hybrid transceiver poses system design challenges for performance optimization, package size, and power dissipation. To overcome these challenges, the next generation transceiver may include only the optical components, while the electronic blocks will be hosted externally on the transponder board. This separation enables the use of small form-factor pluggable (SFP) packages, where the aggregated optical signal consists of up to four independent channels, each carrying data at a rate of 25 Gbaud and higher. In turn, each of the optical channels is detected and converted to an electrical signal by the optical module. The electrical signal is transmitted over a printed transmission line (PTL) from the optical module to the electronic module. Both modules are hosted on the host printed circuit board (PCB), e.g., backplane.

Effective area utilization of a PCB is very important for cost-effective, compact and high port density solutions. Therefore, for effective use of the PCB area, the transmission lines (TLs) and the components should be integrated tightly. In next generation data center transceivers, each of the PTLs is expected to support 25 Gbaud and higher, i.e., ultra-broadband electrical signals. However, dense integration of the TLs in high-speed applications can intensify impairments, such as crosstalk, which in turn leads to signal degradation. The common techniques to reduce those impairments include properly separated and well-shielded TLs, or multilayer design with isolated high-speed lines. However, those techniques are tailor-made for a specific application and increase the cost and the required area of the PCB compared to low-speed applications where those impairments are negligible.

Coupled PTLs have been studied in various RF and microwave applications and accordingly compensation techniques have been proposed. Mbairi et al. studied the crosstalk between adjacent high-frequency printed transmission lines (TLs) as a function of traces separation [1]. It was shown that the crosstalk for coupled microstrips and coupled stripline varied considerably with frequency and should not be ignored. It was proposed to increase the adjacent traces separation, but this reduces the effective utilization of the PCB. On the other hand, Prachumrasee et al. studied the crosstalk between coupled microstrips in hard drive applications [2]. The crosstalk has been suppressed by using differential lines and a magnetic composite. But, the differential lines required more area compared to single-ended lines [3]. Alternatively, Pelard et al. present integrated circuit solutions that compensate for crosstalk and intersymbol interference (ISI) of high-speed data transmission over legacy systems, e.g., short reach optics and electrical backplanes [4]. They showed that crosstalk canceller (XTC) improves the bit error rote (BER) significantly and enables 10 Gbps data rates on legacy systems. Also, in order to mitigate the crosstalk impairment in coupled microstrips, Kao et al. presented a 10 Gbps parallel receiver with joint XTC and decision-feedback equalizer (DFE) [5]. It was demonstrated that the adaptive receiver can compensate for channel loss and cancel the far end crosstalk (FEXT) simultaneously. Similarly, Oh et al. designed a multiple high-speed I/Os XTC analog front-end that handles the crosstalk of coupled microstrips at 12 Gbps and improved the eye opening considerably [3]. Recently, Han et al. realized a 2×50 Gbps receiver with adaptive channel loss equalizer and XTC using a SiGe BiCMOS process [6]. The adaptive joint XTC equalizer compensated for the crosstalk and loss of the coupled microstrips with capacitive- or inductive-coupling nature. However, all the electrical analog XTC techniques in [3-6] are limited by their compensation, such that wideband signals with pronounced coupling and significant microstrip length may require a more accurate compensation model.

It is therefore a purpose of the present invention to provide inclusive methods of compensating for coupling impairments that occur in systems comprising two or more transmission lines.

It is another purpose of the present invention to provide inclusive compensation methods for the coupling impairments of coupled-pair microstrips in optical communication systems that improve the receiver sensitivity and support significantly longer microstrip traces as compared to the classical crosstalk compensation technique.

Further purposes and advantages of this invention will appear as the description proceeds.

SUMMARY OF THE INVENTION

In a first aspect the invention is a method of compensating for coupling impairments in transmission systems comprising two or more coupled transmission lines. The method comprises introducing into the system a component comprising an electronic circuit that is configured to realize at least one of: (a) an exact electrical coupling impairments compensation (EECC) algorithm and (b) a spectrally fragmented electrical coupling compensation (SF-ECC) algorithm, wherein the SF-ECC can be used for compensation of coupling impairments In the frequency domain by a frequency-domain SF-ECC algorithm, and in the time domain by a time-domain SF-ECC algorithm.

In embodiments of the method the system is an ultra-broadband optoelectronic system comprising coupled pair-microstrip (CP-MS) traces.

In embodiments of the method the EECC algorithm comprises:

$$\underline{v}_n^{(EECC)} = IDTFT\left\{\hat{H}_{MS}^{-1}(j\omega') \cdot DTFT\left\{\left[h_{MS}(t) * v_{in}(t,0)\right]_{t=\frac{n\cdot T_s}{SPS}}\right\}\right\}$$

wherein $\underline{v}_n^{(EECC)}$ is the compensated digital signal vector, n is the sampling index, DTFT stands for the discrete-time Fourier transform, IDTFT is the inverse DTFT, $V_{in}(t,0)$ is the time-domain injected ultra-broadband electrical signal column vector at the CP-MS inputs, $h_{ms}(t)$ is the coupling impulse response matrix $\mathfrak{S}^{-1}\{H_{MS}(j\omega)\}$, $\mathfrak{S}$ stands for the Fourier transform, $T_s$ is the sampling period, SPS is the number of samples-per-symbol, * denotes the convolution operation, $\hat{H}_{MS}^{-1}(j\omega')$ is the inverse matrix of the sampled coupling transfer function, $\omega' \in [-\omega_s/2, \omega_s/2]$ is the digital angular frequency, and $\omega_s$ is the angular sampling frequency that follows the sampling frequency $f_s$ of the analog to digital (ADC), which is related to the sampling period by $T_s = 2\pi/\omega_s$. In these embodiments for CP-MS traces the inverse matrix of the sampled coupling transfer function is:

$$\hat{H}_{MS}^{-1}(j\omega') = \begin{bmatrix} \cos(\omega'\Delta\tau_{MS}(\omega')) & j\sin(\omega'\Delta\tau_{MS}(\omega')) \\ j\sin(\omega'\Delta\tau_{MS}(\omega')) & \cos(\omega'\Delta\tau_{MS}(\omega')) \end{bmatrix}.$$

In embodiments of the method the SF-ECC algorithm is:

$$\underline{v}_n^{(SF-EECC)} = IDTFT\left\{\tilde{H}_{MS}^{-1}(j\omega) \cdot DTFT\left\{\left[h_{MS}(t) * v_{in}(t,0)\right]_{t=\frac{n\cdot T_s}{SPS}}\right\}\right\}.$$

In these embodiments the frequency-domain SF-ECC algorithm comprises:

$$\tilde{H}_{MS}^{-1}(j\omega) = \begin{bmatrix} \tilde{H}_{IL}^{(MS)}(j\omega) & -\tilde{H}_{FEXT}^{(MS)}(j\omega) \\ -\tilde{H}_{FEXT}^{(MS)}(j\omega) & \tilde{H}_{IL}^{(MS)}(j\omega) \end{bmatrix}$$

where, $$\tilde{H}_{IL}^{(MS)}(j\omega) = \cos\left(\omega \sum_{k=1}^M \Delta\tau_{MS}^{(k)}(\omega)\right)$$

and $$\tilde{H}_{FEXT}^{(MS)}(j\omega) = -j\sin\left(\omega \sum_{k=1}^M \Delta\tau_{MS}^{(k)}(\omega)\right)$$

and the compensated digital signal vector is:

$$\underline{v}_n^{(SF-ECC)} = IDTFT\left\{\tilde{H}_{MS}^{-1}(j\omega) \cdot DTFT\left\{\left[h_{MS}(t) * v_{in}(t,0)\right]_{t=\frac{n\cdot T_s}{SPS}}\right\}\right\}.$$

In these embodiments the time-domain SF-ECC algorithm comprises:

$$\tilde{h}_{MS}^{-t}(t) = \begin{bmatrix} \tilde{h}_{IL}^{(MS)}(t) & -\tilde{h}_{FEXT}^{(MS)}(t) \\ -\tilde{h}_{FEXT}^{(MS)}(t) & \tilde{h}_{IL}^{(MS)}(t) \end{bmatrix}$$

where $$\tilde{h}_{IL}^{(MS)}(t) = \mathcal{F}^{-1}\{\tilde{H}_{IL}^{(MS)}(j\omega)\},$$

$$= \sum_{k=1}^M \tilde{h}_{IL}^{(MS)(k)}(t)$$

$$\tilde{h}_{FEXT}^{(MS)}(t) = \mathcal{F}^{-1}\{\tilde{H}_{FEXT}^{(MS)}(j\omega)\},$$

$$= \sum_{k=1}^M \tilde{h}_{FEXT}^{(MS)(k)}(t)$$

$$\tilde{h}_{IL}^{(MS)(k)}(t) = \mathcal{F}^{-1}\{\tilde{H}_{IL}^{(MS)(k)}(j\omega)\}$$

$$= \frac{1}{2\pi}\int_{-\infty}^{\infty} \cos(\omega\Delta\tau_{MS}(\omega))\Pi(j\omega - j\omega_0^{(k)})e^{j\omega t}d\omega$$

$$\cong \frac{1}{2\pi}\int_{-\infty}^{\infty} \cos(\omega\Delta\tau_{MS(1)}^{(k)}(\omega))\Pi(j\omega - j\omega_0^{(k)})e^{j\omega t}d\omega$$

$$= \frac{1}{4\pi}\int_{-\infty}^{\infty} e^{j\omega\left(\Delta\tau_{MS_0}^{(k)} - \omega_0^{(k)}\Delta\tau_{MS_1}^{(k)}\right) + j\omega^2 \Delta\tau_{MS_1}^{(k)}} \Pi(j\omega - j\omega_0^{(k)})e^{j\omega t}d\omega +$$

$$= \frac{1}{4\pi}\int_{-\infty}^{\infty} e^{-j\omega\left(\Delta\tau_{MS_0}^{(k)} - \omega_0^{(k)}\Delta\tau_{MS_1}^{(k)}\right) - j\omega^2 \Delta\tau_{MS_1}^{(k)}} \Pi(j\omega - j\omega_0^{(k)})e^{j\omega t}d\omega$$

$$= A\begin{bmatrix} \sqrt{j}\, e^{-j\vartheta^{(k)}(t)} * \delta(t + \gamma^{(k)}) + \\ \sqrt{-j}\, e^{j\vartheta^{(k)}(t)} * \delta(t - \gamma^{(k)}) \end{bmatrix} * \text{sinc}\left(\frac{B_M}{2}t\right)e^{j\omega_0^{(k)}t}$$

and $$\tilde{h}_{FEXT}^{(MS)(k)}(t) \cong A \cdot \begin{bmatrix} -\sqrt{j}\, e^{-j\vartheta^{(k)}(t)} * \delta(t + \gamma^{(k)}) + \\ \sqrt{-j}\, e^{j\vartheta^{(k)}(t)} * \delta(t - \gamma^{(k)}) \end{bmatrix} * \text{sinc}\left(\frac{B_M}{2}t\right)e^{j\omega_0^{(k)}t}$$

and the compensated digital signal vector is:

$$v_n^{(SF-ECC)} = \left\{ \tilde{h}_{MS}^{-1}(t) * \left\{ [h_{MS}(t)^* v_{in}(t, 0)]_{|t=\frac{n T_s}{SPS}} \right\} \right\}.$$

In embodiments of the method the EECC algorithm can be utilized for coupled multiple transmission lines by using the exact inverse matrix sampled coupling transfer function of the coupled multiple transmission lines.

In embodiments of the method the SF-ECC algorithm can be utilized for coupled multiple transmission lines by using the approximated frequency-domain transfer function of the coupled multiple transmission lines or by using the approximated time-domain impulse response of coupled multiple transmission lines.

In embodiments of the method the component that comprises an electronic circuit configured to realize at least one of: the EECC algorithm, the frequency-domain SF-ECC algorithm, and the time-domain SF-ECC algorithm is a digital signal processing (DSP) unit. Embodiments of the DSP unit can be extended to compensate for intersymbol interference (ISI) by addition of an interpolator and a feed-forward equalizer and decision feedback equalizer (FFE-DFE).

The DSP unit can be located at one of:
a) the transmitter side of the optoelectronic system for pre-compensation implementation of the coupling impairments by the EECC or SF-ECC algorithms; and
b) the receiver side of the optoelectronic system for post-compensation implementation of the coupling impairments by the EECC or SF-ECC algorithms.

In embodiments of the method one DSP unit is located at the transmitter side of the optoelectronic system for pre-compensation implementation of the coupling impairments by the EECC or SF-ECC algorithms and a second DSP unit comprising an interpolator and a FFE-DFE is located at the receiver side of the optoelectronic system.

In a second aspect the invention is a digital signal processing (DSP) unit for an ultra-broadband optoelectronic system. The DSP unit comprises an electronic circuit configured to realize at least one of an EECC algorithm, a frequency-domain SF-ECC algorithm, and a time-domain SF-ECC algorithm.

Embodiments of the DSP unit additionally comprise an interpolator and a feed-forward equalizer and decision feedback equalizer (FFE-DFE).

All the above and other characteristics and advantages of the invention will be further understood through the following illustrative and non-limitative description of embodiments thereof, with reference to the appended drawings.

BRIEF DESCRIPTION OF THE DRAWINGS

FIG. 1(a) and FIG. 5(b) show respectively graphs of $\Delta \tau_{MS}$, and $\Delta \tau_{MS}$, versus frequency;

FIG. 2(a) shows graphs of the approximated crosstalk canceller (XTC) and exact insertion loss (IL) versus frequency for a coupled-pal r microstrip;

DETAILED DESCRIPTION OF EMBODIMENTS OF THE INVENTION

The Invention is methods of compensating for coupling impairments that occur in transmission systems comprising two or more transmission lines. The invention will be described herein with reference to a specific example of optical communication; however it is to be understood that the solutions described herein are applicable to any case, e.g. communication applications with rapid transmission lines (above 10 giga), in which similar phenomenon occur. In the case of optical communication systems, the next generation of pluggable modules in data centers connectivity is considered herein. The separation between the optical components and the electronic blocks introduces a new challenge in the transmission of ultra-broadband signals over coupled microstrip traces, which in turn significantly enhances the coupling impairments. In the case of optical systems the goal of the present invention is to provide inclusive compensation methods for the coupling impairments of coupled-pair and multiple pairs of microstrips that will improve the receiver sensitivity and support significantly longer microstrip traces as compared to the classical crosstalk compensation technique. As discussed herein below, the compensation methods provided for a pair of transmission lines can be extended for use with multiple transmission lines.

Before describing the compensation methods, an exact coupling impairments model will be derived. This model can be analytically (or numerically) derived, simulated by simulation tool, and measured In lab. The model is required in order to derive compensation algorithms of the invention and to measure their performance as compared to existing compensation methods.

Figure 1:
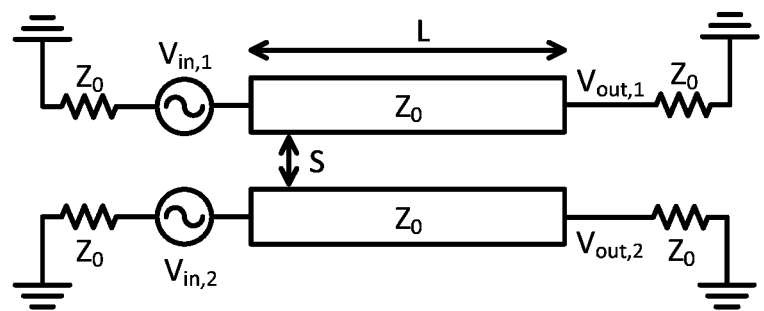
FIG. 1 shows a four-port network composed of coupled-pair TLs.

FIG. 1 shows a four-port network composed of coupled-pair transmission lines (CP-TL) of length L, where each of the ports is terminated with impedance of $Z_0$. The studied CP-TL is uniformly coupled, symmetrical, and lossless. In the case that the coupling is absent, each of the TLs has impedance of $Z_0$ and the frequency-domain voltage waves over the $1^{st}$ and $2^{nd}$ lines after propagation a distance of Z, respectively, are:

$$V_{out,1} = V_{in,1} e^{-j\beta_{TL} z} \quad (1)$$

and $$V_{out,2} = V_{in,2} e^{-j\beta_{TL} z} \quad (2)$$

where $V_{in,1}$ and $V_{in,2}$ are the frequency-domain input voltage waves to the $1^{st}$ and $2^{nd}$ TLs, respectively, and $\beta_{TL}$ is the propagation constant of a single TL. On the other hand, in the presence of coupling between the CP-TL, the output voltages in (1)-(2) should be modified. Following the coupling mode theory, the derivates of (1) and (2) with respect to Z for weak coupling become [7]:

$$\frac{dV_{out,1}}{dz} = -j\beta_{TL} V_{out,1} - jK_x V_{out,2} \quad (3)$$

and $$\frac{dV_{out,2}}{dz} = -jK_x V_{out,1} - j\beta_{TL} V_{out,2}, \quad (4)$$

where $K_x$ is the mutual coupling coefficient between the coupled lines. The solution of the coupled differential system in (3)-(4) for general input wave voltages $V_{in,1}$ and $V_{in,2}$ is [7]:

$$V_{out,1} = \frac{V_{in,1}}{2}\left(e^{-j\beta_s z} + e^{-j\beta_f z}\right) + \frac{V_{in,2}}{2}\left(e^{-j\beta_s z} - e^{-j\beta_f z}\right) \quad (5)$$
$$= [V_{in,1} \cos(\omega \Delta \tau_{TL}) - jV_{in,2} \sin(\omega \Delta \tau_{TL})] \cdot e^{-j\beta_{TL} z}$$

and similarly $$V_{out,2} = [-jV_{in,1} \sin(\omega \Delta \tau_{TL}) + V_{in,2} \cos(\omega \Delta \tau_{TL})] \cdot e^{-j\beta_{TL} z} \quad (6)$$

where the initial conditions at Z=0 are assumed to be the superposition of the following cases:

$$V_{out,1} = V_{in,1}, V_{out,2} = 0 \quad (7)$$

and $$V_{out,1} = 0, V_{out,2} = V_{in,2} \quad (8)$$

In (5)-(6) it was denoted that $$\Delta \tau_{TL} = \frac{\Delta \beta_{TL} z}{2\omega} = \frac{K_x z}{\omega}, \quad (9)$$

where $\Delta \tau_{TL}$ is the differential group delay of IL (DGD-TL), $\omega$ is the angular frequency, $\Delta \beta_{TL} = \beta_s - \beta_f$, $\beta_s = \beta_{TL} + K_x$, and $\beta_f = \beta_{TL} - K_x$ are the slow and fast propagation constants of the slow and fast propagation modes, respectively. In the case that $\Delta \tau_{TL}$ is non-zero, the slow and the fast propagation modes experience a propagation delay difference that leads to modal dispersion similar to polarization mode dispersion (PMD) in optical fiber. This is further elaborated herein below.

To attain the object of the invention the coupling impairments of the CP-TL are studied. The associated coupling transfer function matrix is defined as follows:

$$H_{TL}(j\omega) = \begin{bmatrix} |S_{21}(j\omega)| & -j|S_{23}(j\omega)| \\ -j|S_{41}(j\omega)| & |S_{43}(j\omega)| \end{bmatrix}, \quad (10)$$

where $S_{ij}(j\omega)$ is the scattering parameter of the $i^{th}$ output and the $j^{th}$ input of the measured network [8]. From (5)-(6), the coupling transfer function matrix of CP-TL is:

$$H_{TL}(j\omega) = \begin{bmatrix} \cos(\omega \Delta \tau_{TL}) & -j\sin(\omega \Delta \tau_{TL}) \\ -j\sin(\omega \Delta \tau_{TL}) & \cos(\omega \Delta \tau_{TL}) \end{bmatrix}, \quad (11)$$

where each of the terms in the main diagonal stands for the insertion loss (IL) of CP-TL and each of the terms in the secondary diagonal stands for the far end crosstalk (FEXT) of CP-TL. The FEXT describes the coupling between the TLs at the receive end (far end) with respect to the interfering signal. In the case that $\omega \Delta \tau_{TL} \neq \pi n$, where n is integer, crosstalk between the two input signals occurs.

The polarization mode dispersion (PMD) impairment is well-known in optical fiber communication [9]. The random imperfectness and the arbitrary asymmetric structure (e.g., bends, twists, and stresses) along the optical fiber randomly change the polarization state of the propagated light. Thus, each polarization of the light travels at a different random speed and pulse broadening is introduced. The $1^{st}$ order PMD for a single section of optical fiber can be described by the Jones matrix for the rotated polarization state [10]:

$$M(\theta) = R(-\theta) \cdot M \cdot R(\theta), \quad (12)$$

where $R(\theta)$ is the linear polarization operator at angle $\theta$ which is given by:

$$R(\theta) = \begin{bmatrix} \cos\theta & -\sin\theta \\ \sin\theta & \cos\theta \end{bmatrix} \quad (13)$$

and M is the phase retarder operator which is given by:

$$M = \begin{bmatrix} \exp(j\omega \Delta \tau / 2) & 0 \\ 0 & \exp(-j\omega \Delta \tau / 2) \end{bmatrix}. \quad (14)$$

In (13), $\theta$ is the angle between the state of polarization (SOP) of the electrical field at the fiber input and the principal state of polarization (PSP) of the optical fiber, and in (14) $\Delta\tau$ is the differential group delay (DGD). The DGD is random in nature, time varying and wavelength dependent [9,10]. The worst PMD occurs in the case of equal projections of the polarization of the electrical field at the fiber input, i.e. $\theta = \pi/4$, where the $1^{st}$ order PMD becomes:

$$M\left(\frac{\pi}{4}\right) = \begin{bmatrix} \cos(\omega\Delta\tau/2) & -j\sin(\omega\Delta\tau/2) \\ -j\sin(\omega\Delta\tau/2) & \cos(\omega\Delta\tau/2) \end{bmatrix}. \quad (15)$$

This result is mathematically identical to the coupling transfer function matrix of CP-TL in (11), where $\Delta\tau_{TL}=\Delta\tau/2$. Therefore, the DGD-TL $\Delta\tau_{TL}$ is fully analogous to the DGD in optical fiber.

Microstrip is commonly used in PCB due to its simple structure and easy integration compared to other types of PTLs [8]. However, a microstrip is an inhomogeneous structure as part of the electromagnetic (EM) field propagates inside the substrate while the rest propagates in the free-space. In the static limit, all the EM field propagates inside the substrate, while the portion of the propagated EM field in the free-space increases as a function of frequency. Therefore, the supported mode of propagation In a microstrip is quasi-transverse EM (TEM) [7]. As the ratio between the EM parts is frequency dependent, the dielectric constant of the total propagated EM field, $\varepsilon_{r_{eff}}(\omega)$, effectively varies with frequency. The effective dielectric constant $\varepsilon_{r_{eff}}(\omega)$ can be calculated by various models [11]. In the case that the frequency variation of $\varepsilon_{r_{eff}}(\omega)$ within the signal's band is significantly pronounced, chromatic dispersion (CD) and signal broadening are introduced. This results from the non-zero second order derivative term of the microstrip propagation constant of the injected signal. The microstrip propagation constant is given by:

$$\beta_{MS}(\omega) = \omega\frac{\sqrt{\varepsilon_{r_{eff}}(\omega)}}{c}, \quad (16)$$

where c is the speed of light. Note that $\beta_{MS}(\omega)$ is equivalent to $\beta_{TL}$ and related to the CD [12]. This is a result of the frequency dependence of $\beta_{MS}$, which is out of the scope of the invention, and it is not included in the coupling model in (11).

In the literature, the CP-MS is commonly analyzed by the normal-modes [7,8]. As the studied CP-MS is symmetrical, the normal modes are the even-mode, i.e. $V_{in,1}=V_{in,2}$, and the odd-mode, i.e., $V_{in,1}=-V_{in,2}$. The propagation constants of the even- and odd-mode are denoted as the even propagation constant $\beta_e$ and odd-propagation constant $\beta_o$. In [7], it has been shown that the coupling model of symmetrical CP-TL derived from the coupling mode theory in (11) is identical to the coupling model derived from the normal-mode method, i.e., $\beta_e=\beta_s$ and $\beta_o=\beta_f$. In quasi-TEM channels such as CP-MS, the mutual-coupling coefficient $\kappa_x$ is not negligible and each of the modes propagates in a different velocity, i.e., $\Delta\beta_{TL}\neq 0$ [7]. Therefore, in the case of CP-MS, the DGD of microstrip (DGD-MS) $\Delta\tau_{MS}$ is non-zero, which leads to modal dispersion and pulse broadening.

Figures 2A, 2B:
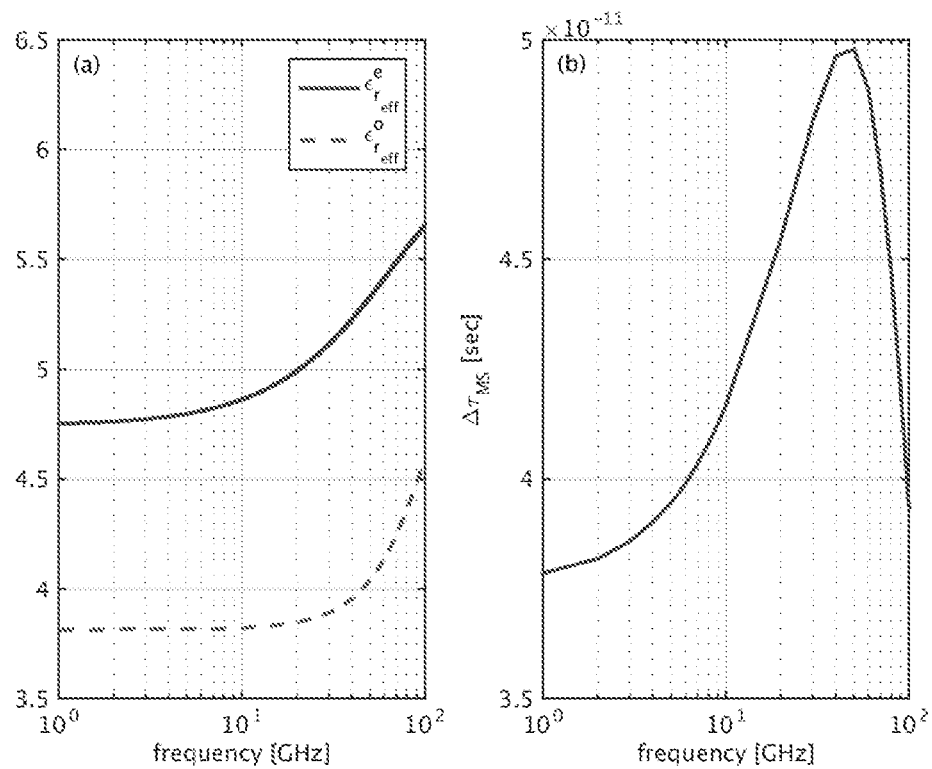
FIG. 2(a) shows graphs of the even-effective dielectric constant of the even-mode and the odd-effective dielectric constant of the odd-mode vs. frequency.
FIG. 2(b) shows a graph of the differential group delay of a microstrip vs. frequency.

The microstrip propagation constant in (16) can be generalized for the even-mode propagation constant:

$$\beta_e(\omega) = \omega\frac{\sqrt{\varepsilon^e_{r_{eff}}(\omega)}}{c} \quad (17)$$

and for odd-mode propagation constant:

$$\beta_o(\omega) = \omega\frac{\sqrt{\varepsilon^o_{r_{eff}}(\omega)}}{c}, \quad (18)$$

where $\varepsilon_{r_{eff}}^e$ is the even-effective dielectric constant of the even-mode, and $\varepsilon_{r_{eff}}^o$ is the odd-effective dielectric constant of the odd-mode. Therefore, in the case of CP-MS of length L, the DGD-MS is:

$$\Delta\tau_{MS} = \frac{\Delta n_{MS}}{2c}L, \quad (19)$$

where $\Delta n_{MS}=\sqrt{\varepsilon^e_{r_{eff}}(\omega)}-\sqrt{\varepsilon^o_{r_{eff}}(\omega)}$. Similar to $\varepsilon_{r_{eff}}$, the $\varepsilon_{r_{eff}}^e$ and $\varepsilon_{r_{eff}}^o$ are frequency dependent and can be calculated by [13]. Additionally, the difference between $\varepsilon_{r_{eff}}^e$ and $\varepsilon_{r_{eff}}^o$ varies with frequency, such that $\Delta n_{MS}$ is not constant, and in turn $\Delta\tau_{MS}$ is frequency dependent [13]. In FIG. 2(a), following the theoretical model in [13], and $\varepsilon_{r_{eff}}^o$ versus frequency are presented, and in FIG. 2(b), following (19), $\Delta\tau_{MS}$ versus frequency is shown. Both figures are for CP-MS with L=10 cm, S=100 μm and $Z_0$=50Ω, which is fabricated over RO3006 substrate (dielectric constant of $\varepsilon_r$=6.15) with thickness of 300 μm, which is within the range of conventional substrate thickness values [3,14,15]. The small analog traces spacing is selected to allow high port density, while lower spacing values of coupled microstrips fabricated over RO3006 may be less practical due to fabrication challenges.

FIG. 2(a) and FIG. 2(b) reveal that the frequency dependent effect is significantly pronounced within the spectrum of the ultra-broadband electrical signal. The frequency dependence of $\Delta\tau_{MS}$ within the signal band results in a frequency-dependent modal dispersion. This is similar to the waveguide dispersion in optical fiber, which is in addition to the PMD [9].

In summary, the coupling impairments of the CP-MS are the following: (a) crosstalk (when the secondary diagonal of the coupling transfer function is non-zero), (b) modal dispersion (similar to PMD), and (c) frequency-dependent dispersion (similar to waveguide dispersion).

In the case of CP-MS, the coupling transfer function matrix is modified to $$H_{MS}(j\omega) = \begin{bmatrix} \cos(\omega\Delta\tau_{MS}(\omega)) & -j\sin(\omega\Delta\tau_{MS}(\omega)) \\ -j\sin(\omega\Delta\tau_{MS}(\omega)) & \cos(\omega\Delta\tau_{MS}(\omega)) \end{bmatrix}. \quad (20)$$

Figure 3A:
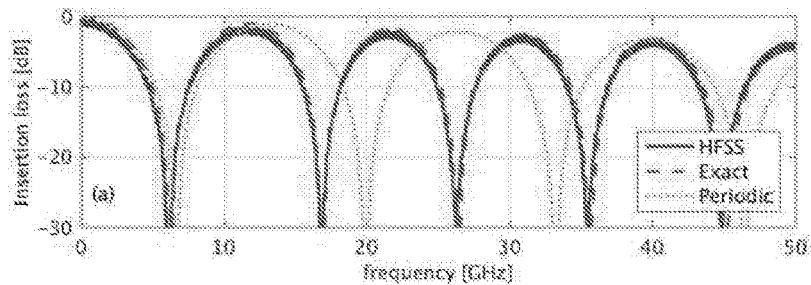
FIG. 3(a) shows graphs of insertion loss vs. frequency for a coupled-pair microstrip.
Figure 3B:
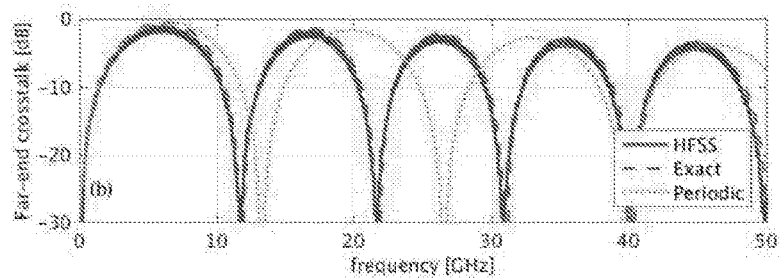
FIG. 3(b) shows graphs of far-end crosstalk vs. frequency for a coupled-pair microstrip.
Figure 4A:
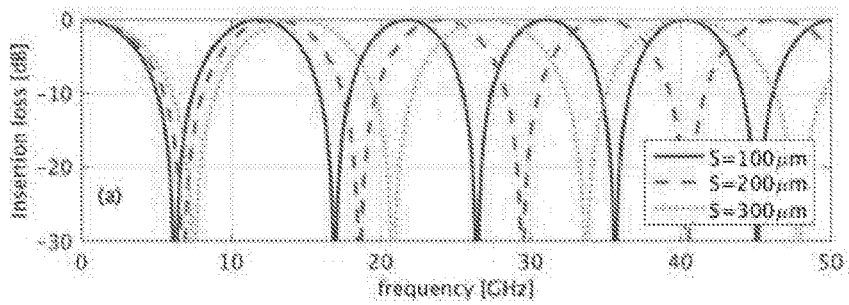
FIG. 4(a) shows graphs of insertion loss vs. frequency for several values of distance between microstrips in a coupled-pair microstrip.
Figure 4B:
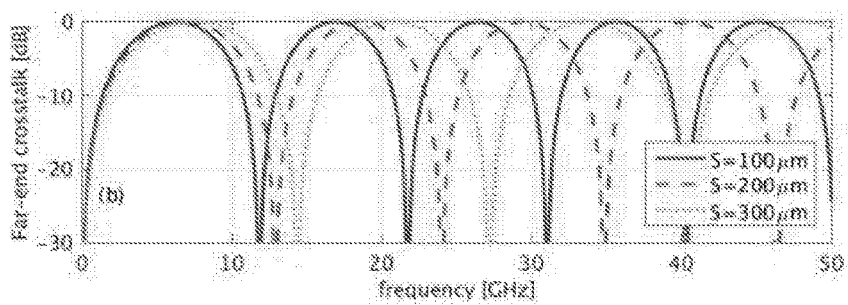
FIG. 4(b) shows graphs of far-end crosstalk vs. frequency for several values of distance between microstrips in a coupled-pair microstrip.

In FIG. 3(a) and FIG. 3(b) the exact insertion loss (IL) and the exact far-end crosstalk (FEXT) (as defined in (20)) of CP-MS are presented. The continuous curves are the high frequency structure simulator (HFSS) simulation results, and the dashed curves follow the coupling transfer function in (20), where the estimated frequency-dependent loss (FDL) is $1.6 \cdot 10^{-2}$ dB/(GHz·cm). Both the continuous and the dashed curves are for identical parameters of the CP-MS as in FIG. 2(a) and FIG. 2(b). It can be observed that the simulation results are identical to the proposed coupling model in (17)-(20). Notice that as $\Delta\tau_{MS}$ is frequency dependent, the IL and the FEXT of the CP-MS follow a quasi-periodic variation with respect to the frequency. This exact model agrees with the simulation findings reported in [1]. On the other hand, in the case that $\Delta\tau_{MS}$ is assumed to be constant, i.e., $\kappa_x$ in (9) is proportionally linear versus frequency, the IL and FEXT obey a periodic variation, which is presented by the dotted curves of FIGS. 3(a) and 3b, where $\Delta\tau_{MS}=\Delta\tau_{MS}(0)$. The relationship between the exact coupling model, the approximated periodic coupling model and the XTC is further elaborated herein below. Notice that, in the example presented in FIG. 3(a) and FIG. 3(b), the accuracy of the periodic model is limited to the low frequency region only, i.e., sub-10G transmission. For higher transmission bandwidth (25G and above) a more accurate model is required. This is the exact coupling model of CP-MS in (17)-(20). In addition, in FIG. 4a) and FIG. 4(b), the exact IL and the exact FEXT (as defined in (20)) of lossless CP-MS versus frequency, for various traces spacing S values are presented. All curves are for identical parameters of the CP-MS as in FIG. 2(a) and FIG. 2(b). FIG. 4(a) and FIG. 4(b) reveal that the quasi-periodic frequency variation effect is significantly pronounced within the spectrum of the ultra-broadband electrical signal.

In recent years, the crosstalk cancellation (XTC) between baseband signals that are transmitted over coupled microstrips became a standard practice [3-6]. Those XTC techniques are based on the assumption that the signal at the output of the direct line is a linear combination of the desired signal with the negative derivative of the coupled signal. Therefore, in the case of lossless CP-MS, the coupling transfer function matrix that is assumed for the XTC techniques is [16]:

$$\hat{H}_{MS}(j\omega) = \begin{bmatrix} 1 & -j\omega\sigma \\ -j\omega\sigma & 1 \end{bmatrix} \quad (21)$$

where $\sigma$ is the forward coupling strength; and recall that the Fourier transform of the derivative with respect to time is $j\omega$. An example of XTC technique, based on the coupling model in (21), is given in [16]. According to this XTC technique, the compensated frequency-domain electrical signal vector is:

$$\underline{V}^{(XTC)}(j\omega) = \begin{bmatrix} 1 & j\omega\xi \\ j\omega\xi & 1 \end{bmatrix} \hat{H}_{MS}(j\omega)V_{in}(j\omega) \quad (22)$$

$$= \begin{bmatrix} 1+\sigma\xi\omega^2 & -j\omega(\sigma-\xi) \\ -j\omega(\sigma-\xi) & 1+\sigma\xi\omega^2 \end{bmatrix} V_{in}(j\omega)$$

where $V_{in}(j\omega)$ is the frequency-domain input signal vector, $\xi$ is the XTC gain term, and the underline stands for the compensated signal. In the case that $\xi=\sigma$, the crosstalk is cancelled and the desired signal is amplified. As a similar coupling model is assumed, all those XTC techniques are denoted as the "classical-XTC". Note that the coupling model in (21) and in turn the XTC techniques in (22) mainly treat the crosstalk, while the other coupling impairments, I.e., modal dispersion and frequency-dependent dispersion, are handled narrowly. This limited treatment will be discussed in more detail herein below. Therefore, in the compensation of ultra-broadband electrical signals where all three coupling impairments are pronounced, the extended coupling model in (20) should be considered.

Herein, the electrical field at the receiver is a linear function of the electrical field at the transmitter. Thus, the electrical field analysis follows the classical linear time invariant (LTI) approach. Given the lossless coupling model of CP-MS in (20), the coupling impairments can be compensated for either in the frequency-domain by the inverse matrix of the sampled coupling model of CP-MS or in the time-domain by the impulse response of the sampled coupling model of CP-MS. Accordingly, in the case of frequency-domain compensation, the compensated digital signal vector is:

$$\underline{v}_{-n}^{(EECC)} = IDTFT\{\hat{H}_{MS}^{-1}(j\omega') \cdot DTFT\{[h_{MS}(t) * v_{in}(t,0)]_{|t=\frac{n \cdot T_s}{SPS}}\}\}, \quad (23)$$

where n is the sampling index, DTFT stands for the discrete-time Fourier transform, IDTFT is the inverse DTFT, $v_{in}(t,0)$ is the time-domain injected ultra-broadband electrical signal column vector at the CP-MS inputs, $h_{MS}(t)$ is the coupling impulse response matrix (i.e., $\mathfrak{I}^{-1}\{H_{MS}(j\omega)\}$, where $\mathfrak{I}$ stands for the Fourier transform), $T_s$ is the sampling period, SPS is the number of samples-per-symbol, * denotes the convolution operation, $\hat{H}_{MS}^{-1}(j\omega')$ is the inverse matrix of the sampled coupling transfer function of CP-MS and given by:

$$\hat{H}_{MS}^{-1}(j\omega') = \begin{bmatrix} \cos(\omega'\Delta\tau_{MS}(\omega')) & j\sin(\omega'\Delta\tau_{MS}(\omega')) \\ j\sin(\omega'\Delta\tau_{MS}(\omega')) & \cos(\omega'\Delta\tau_{MS}(\omega')) \end{bmatrix}, \quad (24)$$

$\omega' \in [-\omega_s/2, \omega_s/2]$ is the digital angular frequency, and $\omega_s$ is the angular sampling frequency that follows the sampling frequency of the analog to digital (ADC), $f_s$, which is related to the sampling period by $T_s=2\pi/\omega_s$. Note that $H_{MS}(j\omega')$ is a unitary matrix for any $\omega'\Delta\tau_{MS}(\omega')$ whose conjugate transpose is also its inverse, i.e. $H_{MS}^{-1}(j\omega')=H^*_{MS}(j\omega')$. For simplicity of notation, from here on the prime over $\omega'$ has been dropped. Each of the terms in the main diagonal stands for the IL of the sampled coupling transfer function of the CP-MS and each of the terms in the secondary diagonal stands for the FEXT of the sampled coupling transfer function of the CP-MS. In [17], a preliminary analysis of the basic compensation approach of (23)-(24) is presented and in [18] a detailed analysis is presented. The compensation technique in (23)-(24) is denoted as frequency-domain "exact electrical coupling compensation" (EECC) for CP-MS.

The EECC in (23)-(24), which is frequency-domain compensation, has been further investigated and an approximated "electrical coupling compensation" (ECC) technique, which compensates equivalently in the time-domain and frequency-domain, is derived. In the following paragraphs, it is shown that using the first order Taylor expansion of $\Delta\tau_{MS}(\omega)$ is suitable for the derivation of the time-domain ECC. Without loss of generality, the Taylor expansion of $\Delta\tau_{Ms}(\omega)$ about the central angular frequency $\omega_0$ is:

$$\Delta\tau_{MS}(\omega) = \Delta\tau_{MS_0} + \Delta\tau_{MS_1} \cdot (\omega-\omega_0) + \frac{\Delta\tau_{MS_2}}{2} \cdot (\omega-\omega_0)^2 + \ldots, \quad (25)$$

where $\Delta\tau_{MS_m}=(\partial^m \Delta\tau_{MS}/\partial\omega^m)|_{\omega=\omega_0}$ with m=0, 1, 2, . . . and $\partial^m/\partial\omega^m$ is the $m^{th}$ order derivative with respect to the variable $\omega$. Note that $\Delta\tau_{MS}$ is frequency dependent and high order terms of the Taylor expansion in (25) are required for the expansion of $\Delta\tau_{MS}$ in the bandwidth of the ultra-broadband electrical signal. This can be understood from the curves of the first and second derivation of $\Delta\tau_{MS}$, namely $\Delta\tau_{MS_1}$ and $\Delta\tau_{MS_2}$.

Figure 5A:
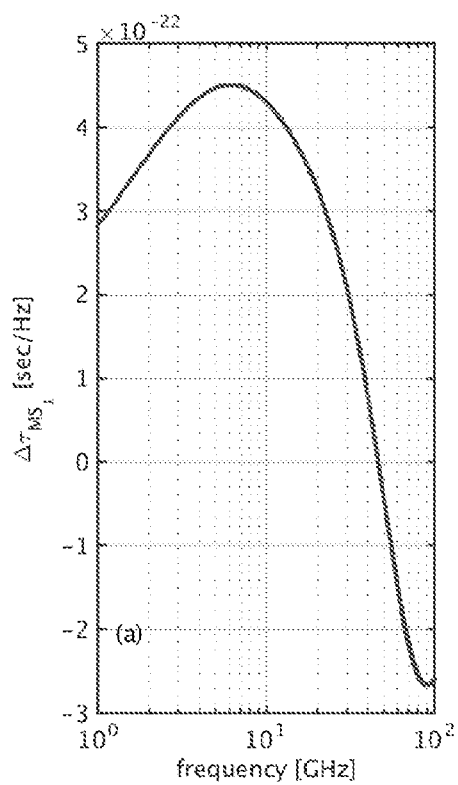
Figure 5B:
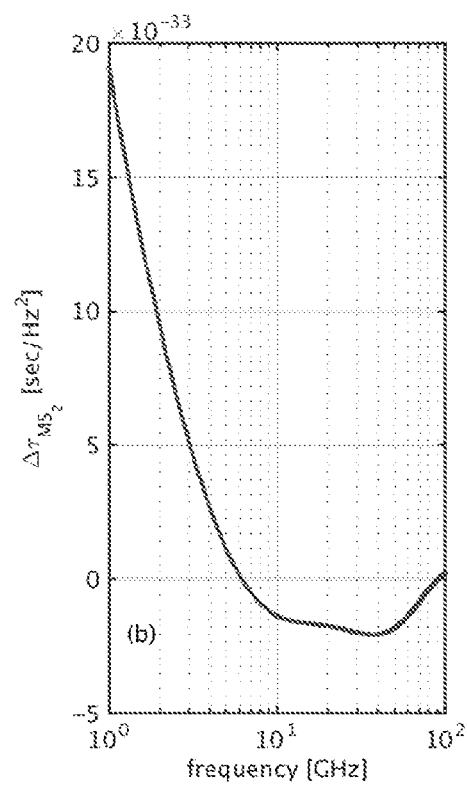

In FIG. 1(a) and FIG. 5(b), $\Delta\tau_{MS_1}$ and $\Delta\tau_{MS_2}$ are shown for CP-MS with L=10 cm S=100 μm, and $Z_0$=50Ω, which is fabricated over RO3006 substrate ($\varepsilon_r$=6.15) with thickness of 300 μm. From this example, as $\Delta\tau_{MS_1}$, and $\Delta\tau_{MS_2}$ are non-constant within the ultra-broadband electrical signal spectrum region, the first and the second order Taylor expansion about a single frequency is not adequate. Thus, it is proposed to subdivide $\Delta\tau_{MS}$ into multiple sub-bands, where in each sub-band $\Delta\tau_{MS}$ can be approximated by its associated first order Taylor expansion. For the $k^{th}$ sub-band of the sampled double-sided signal spectrum of $\Delta\tau_{MS}$, $\omega \in [-\omega_s/2, \omega_s/2]$, the first order Taylor expansion about the $k^{th}$ central angular frequency, $\omega_0^{(k)}$, is:

$$\Delta\tau_{MS}^{(k)}(\omega) = \begin{cases} \Delta\tau_{MS_0}^{(k)} + \Delta\tau_{MS_1}^{(k)} \cdot (\omega - \omega_0^{(k)}), & \omega \in [\omega_{min}^{(k)}, \omega_{max}^{(k)}] \\ 0, & \omega \notin [\omega_{min}^{(k)}, \omega_{max}^{(k)}] \end{cases} \quad (26)$$

where $\Delta\tau_{MS_m}^{(k)} = (\partial^m \Delta\tau_{MS}/\partial\omega^m)|_{\omega=\omega_0^{(k)}}$, $\omega_{min}^{(k)} = \omega_0^{(k)} - 0.5B^{(k)}$, $\omega_{max}^{(k)} = \omega_0^{(k)} + 0.5B^{(k)}$, and $B^{(k)}$ is the bandwidth of the $k^{th}$ sub-band. For simplicity, it is assumed that all sub-bands of the double-sided spectrum have identical bandwidth, i.e., $B_M = \omega_s/M$, where M is the total number of sub-bands of the sampled double-sided spectrum of $\Delta\tau_{MS}$. Consequently, in the case of an ultra-broadband electrical signal transmitted over CP-MS, the approximated frequency-domain ECC (which is the approximation of (24)) is given by:

$$\tilde{H}_{MS}^{-1}(j\omega) = \begin{bmatrix} \tilde{H}_{IL}^{(MS)}(j\omega) & -\tilde{H}_{FEXT}^{(MS)}(j\omega) \\ -\tilde{H}_{FEXT}^{(MS)}(j\omega) & \tilde{H}_{IL}^{(MS)}(j\omega) \end{bmatrix}, \quad (27)$$

where the approximated IL term is $$\tilde{H}_{IL}^{(MS)}(j\omega) = \cos\left(\omega \sum_{k=1}^{M} \Delta\tau_{MS}^{(k)}(\omega)\right) \quad (28)$$

and the approximated FEXT term is $$\tilde{H}_{FEXT}^{(MS)}(j\omega) = -j\sin\left(\omega \sum_{k=1}^{M} \Delta\tau_{MS}^{(k)}(\omega)\right). \quad (29)$$

This compensation method is denoted as the frequency-domain spectrally fragmented-ECC (SF-ECC) for CP-MS. Consequently, the compensated digital signal vector is:

$$v_{-n}^{(SF-ECC)} = IDTFT\left\{\tilde{H}_{MS}^{-1}(j\omega) \cdot DTFT\left\{[h_{MS}(t) * v_{in}(t, 0)]|_{t=\frac{n \cdot T_s}{SPS}}\right\}\right\}. \quad (30)$$

Note that in the case of M→∞, the SF-ECC converges to the EECC for CP-MS in (23)-(24). In addition, the coupling impairments can be compensated for in the time-domain by the impulse response of the sampled coupling model of CP-MS. Given the SF-ECC in (27)-(30), the time-domain SF-ECC is:

$$\tilde{h}_{MS}^{-1}(t) = \begin{bmatrix} \tilde{h}_{IL}^{(MS)}(t) & -\tilde{h}_{FEXT}^{(MS)}(t) \\ -\tilde{h}_{FEXT}^{(MS)}(t) & \tilde{h}_{IL}^{(MS)}(t) \end{bmatrix}, \quad (31)$$

where the impulse response of the approximated IL term is:

$$\tilde{h}_{IL}^{(MS)}(t) = \mathfrak{I}^{-1}\{\tilde{H}_{IL}^{(MS)}(j\omega)\} \quad (32)$$
$$= \sum_{k=1}^{M} \tilde{h}_{IL}^{(MS)(k)}(t)$$

and the impulse response of the approximated FEXT term is:

$$\tilde{h}_{FEXT}^{(MS)}(t) = \mathfrak{I}^{-1}\{\tilde{H}_{FEXT}^{(MS)}(j\omega)\}. \quad (33)$$
$$= \sum_{k=1}^{M} \tilde{h}_{FEXT}^{(MS)(k)}(t)$$

The detailed derivation of (32)-(33) is given in an Appendix located before the Bibliography, and $\tilde{h}_{IL}^{(MS)(k)}(t)$ and $\tilde{h}_{FEXT}^{(MS)(k)}(t)$ are the impulse responses of the approximated IL and FEXT terms within the $k^{th}$ sub-band, respectively. The impulse response of the IL of CP-MS within the $k^{th}$ sub-band is:

$$\tilde{h}_{IL}^{(MS)(k)}(t) = \mathfrak{I}^{-1}\{\tilde{H}_{IL}^{(MS)(k)}(j\omega)\} \quad (34)$$
$$= \frac{1}{2\pi}\int_{-\infty}^{\infty} \cos(\omega\Delta\tau_{MS}(\omega))\Pi(j\omega - j\omega_0^{(k)})e^{j\omega t}d\omega$$
$$\cong \frac{1}{2\pi}\int_{-\infty}^{\infty} \cos(\omega\Delta\tau_{MS_{(1)}}^{(k)}(\omega))\Pi(j\omega - j\omega_0^{(k)})e^{j\omega t}d\omega$$
$$= \frac{1}{4\pi}\int_{-\infty}^{\infty} e^{j\omega\left(\Delta\tau_{MS_0}^{(k)} - \omega_0^{(k)}\Delta\tau_{MS_1}^{(k)}\right) + j\omega^2\Delta\tau_{MS_1}^{(k)}}$$
$$\Pi(j\omega - j\omega_0^{(k)})e^{j\omega t}d\omega +$$
$$\frac{1}{4\pi}\int_{-\infty}^{\infty} e^{-j\omega\left(\Delta\tau_{MS_0}^{(k)} - \omega_0^{(k)}\Delta\tau_{MS_1}^{(k)}\right) - j\omega^2\Delta\tau_{MS_1}^{(k)}}$$
$$\Pi(j\omega - j\omega_0^{(k)})e^{j\omega t}d\omega$$
$$= A \cdot \begin{bmatrix} \sqrt{j}\, e^{-j\vartheta^{(k)}(t)} * \delta(t + \gamma^{(k)}) + \\ \sqrt{-j}\, e^{j\vartheta^{(k)}(t)} * \delta(t - \gamma^{(k)}) \end{bmatrix} * \text{sinc}\left(\frac{B_M}{2}t\right)e^{j\omega_0^{(k)}t},$$

where $\tilde{H}_{IL}^{(MS)(k)}(j\omega)$ is the IL of CP-MS within the $k^{th}$ sub-band, $\Delta\tau_{MS_{(1)}}^{(k)}(\omega) = \Delta\tau_{MS_0}^{(k)} + \Delta\tau_{MS_1}^{(k)}(\omega - \omega_0^{(k)})$ is the first order Taylor expansion of the $k^{th}$ sub-band, $A = B_M/(8\pi\sqrt{\pi\Delta\tau_{MS_1}^{(k)}})$, $\gamma^{(k)} = \Delta\tau_{MS_0}^{(k)} - \omega_0^{(k)}\Delta\tau_{MS_1}^{(k)}$, and $\vartheta^{(k)}(t) = t^2/(4\Delta\tau_{MS_1}^{(k)})$. Also, the following inverse Fourier transforms have been used in (34):

$$\mathfrak{I}^{-1}\{e^{\pm j\omega\gamma^{(k)}}\} = \delta(t \pm \gamma^{(k)}) \text{ and} \quad (35)$$

$$\mathfrak{I}^{-1}\left\{e^{\pm j\omega^2\Delta\tau_{MS_1}^{(k)}}\right\} = \quad (36)$$
$$\sqrt{\frac{\pm j}{4\pi\Delta\tau_{MS_1}^{(k)}}}\, e^{\mp jt^2/\left(4\Delta\tau_{MS_1}^{(k)}\right)} = \sqrt{\frac{\pm j}{4\pi\Delta\tau_{MS_1}^{(k)}}}\, e^{\mp j\vartheta^{(k)}(t)},$$

Similarly, the $k^{th}$ impulse response of the approximated FEXT is:

$$\tilde{h}_{FEXT}^{(MS)(k)}(t) \cong A \cdot \left[ \begin{array}{c} -\sqrt{j} e^{-j\theta^{(k)}(t)} * \delta(t + \gamma^{(k)}) + \\ \sqrt{-j} e^{-j\theta^{(k)}(t)} * \delta(t - \gamma^{(k)}) \end{array} \right] * \mathrm{sinc}\left(\frac{B_M}{2} t\right) e^{j\omega_0^{(k)} t} \quad (37)$$

and the compensated digital signal vector is:

$$\underline{v}_n^{(SF-ECC)} = \left\{ \tilde{h}_{MS}^{-1}(t) * \left\{ [h_{MS}(t) * v_{in}(t, 0)] \big|_{t=\frac{n \cdot T_S}{SPS}} \right\} \right\}.$$

Note that the approximation in the third line of (34) is justified due to the assumption that the first order Taylor expansion about $\omega_0^{(k)}$ is sufficient in $B_M$, I.e., the fragmentation order M is properly selected. The substitution of (34) in (32) and (37) in (33) forms the time-domain SF-EDC equalizer, which includes a filter-bank of M parallel equalizers. Recall that each of the M parallel equalizers is compensating for the $k^{th}$ sub-bands of the ultra-broadband signal. Hence, the compensation can be performed equivalently in the frequency-domain using (27)-(30) or in the time-domain using (31)-(37).

Assuming that $\Delta\tau_{MS}(\omega)$ is constant within the transmission band such that $\Delta\tau_{MS}(\omega) \cong \Delta\tau_{MS}(0)$, then the IL term in (20) is reduced to:

$$\tilde{H}_{IL}^{(MS)}(j\omega) = \cos(\omega \Delta\tau_{MS}(0)) \quad (38)$$

and the FEXT term in (20) is reduced to:

$$\tilde{H}_{FEXT}^{(MS)}(j\omega) = -j \sin(\omega \Delta\tau_{MS}(0)). \quad (39)$$

In turn the IL and FEXT terms in (38)-(39) follow periodic variation with respect to frequency. Note that the frequency dependence of $\Delta\tau_{MS}$ is affected by the transmission band, CP-MS length, L, and its coupling strength, $\kappa_x$. Therefore, this assumption usually holds for sub-10G transmission, as can be observed from the periodic curves (constant $\Delta\tau_{MS}$) compared with the exact curves (frequency dependent $\Delta\tau_{MS}$) in FIG. 3(a) and FIG. 3(b), or when the DSP block is part of the hybrid optical-electrical module, i.e., a short microstrip length of a few cm.

In case where a small-angle approximation of the IL in (38) and the FEXT in (39) can be applied, the coupling transfer function matrix reduces to:

$$\tilde{H}_{MS}(j\omega) = \begin{bmatrix} 1 & -j\omega\Delta\tau_{MS}(0) \\ -j\omega\Delta\tau_{MS}(0) & 1 \end{bmatrix}, \quad (40)$$

Figure 6A:
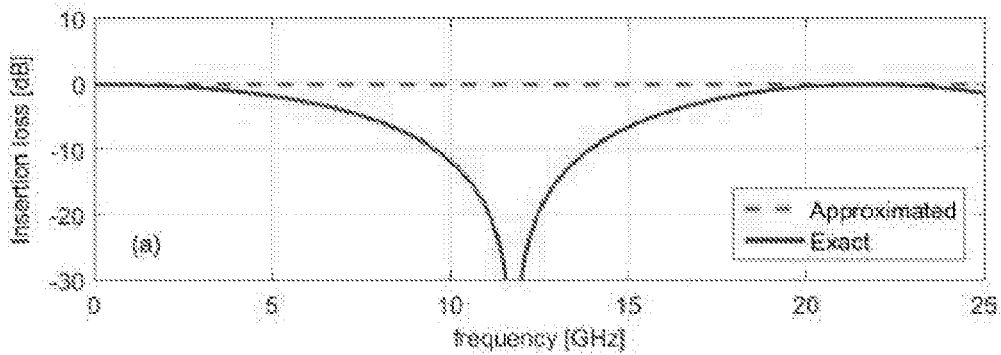
FIG. 6(b) shows graphs of the approximated crosstalk canceller (XTC) and exact far-end crosstalk (FEXT) versus frequency for a coupled-pair microstrip.
Figure 6B:
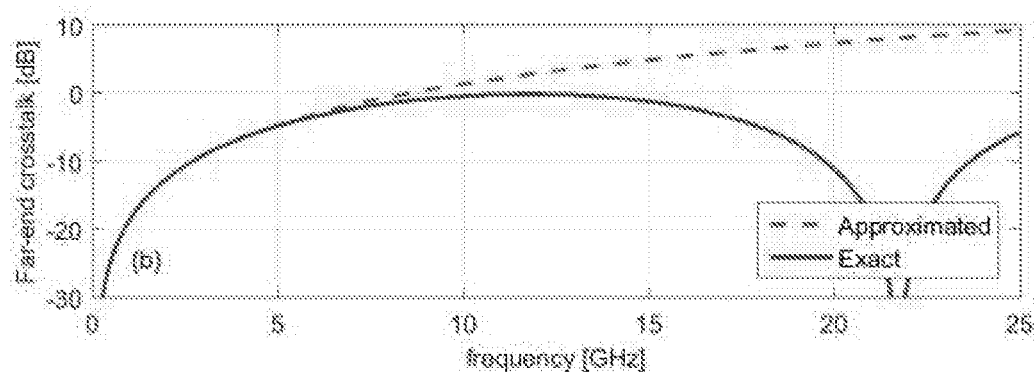

This result is identical to the coupling transfer function matrix in (21) with $\sigma = \Delta\tau_{MS}(0)$, which is the basis for the "classical-XTC" technique. In FIG. 6(a) and FIG. 6(b), the IL and FEXT of the XTC's coupling model (as defined in (21)), which is denoted as approximated IL and approximated FEXT, respectively, and the exact IL and exact FEXT (using (20)) are presented. The curves are for CP-MS with L=5 cm, S=100 µm, $Z_0$=50Ω, $\varepsilon_r$=6.15 and substrate thickness of 300 µm. In the case of the XTC's coupling model, it was assumed that $\sigma = \Delta\tau_{MS}(0)$. This comparison reveals that the XTC's coupling model and in-turn the XTC only holds for limited transmission bandwidth, limited CP-MS length, and limited CP-MS coupling strength. For ultra-broadband communication links (25G and above), the ECC techniques of the invention, i.e. EECC, time-domain SF-ECC, frequency-domain SF-ECC, and 3ECC, which are based on the exact coupling model, should be used.

Figure 7:
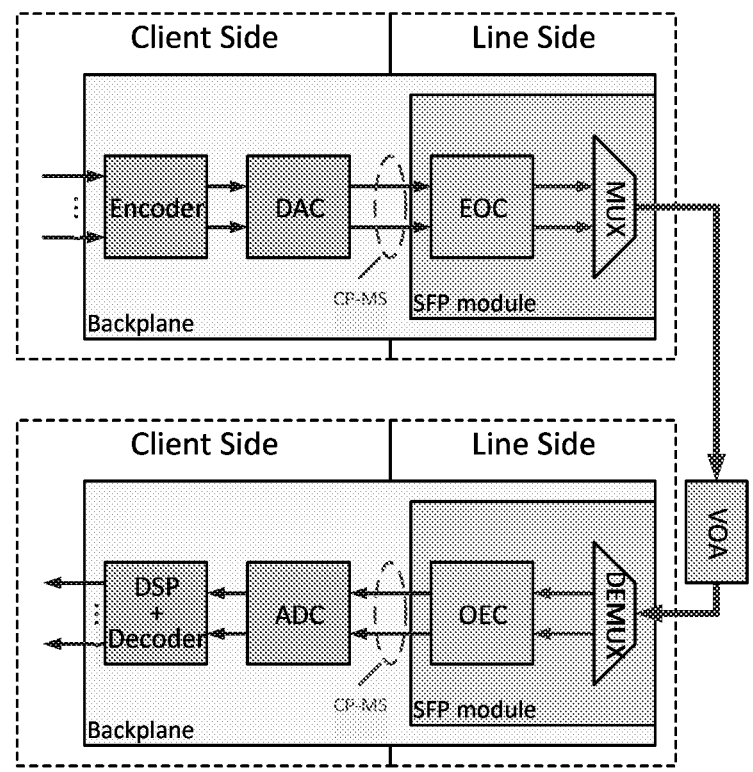
FIG. 7 schematically shows an Ultra-broadband optoelectronic system model.

In FIG. 7, the block diagram of a pair of 25-50 Gbaud non-return-to-zero (NRZ) OOK (50-100 Gb/sec) or a pair of 25 Gbaud optical PAM4 (100 Gb/sec) transmission systems are presented. Depending on the signal modulation, the digital data at the client side is converted into analog signal by a 1-bit or 2-bit digital to analog converter (DAC) for OOK or PAM4, respectively, that has a Butterworth filter response with frequency cutoff (and order) of 17 GHz ($3^{rd}$). The electrical signal is transmitted over a CP-MS; where its model is given in (17)-(20). The CP-MS parameters are $Z_0$=50Ω, S=100 µm, $\varepsilon_r$=6.15, substrate thickness of 300 µm, and variable traces length L. At the CP-MS output, each of the client side signals is converted to an optical signal using an electrical to optical converter (EOC) that consists of a modulator driver and a modulator with extinction ratio of 6 dB. The driver and the modulator have a Butterworth filter response with frequency cutoff (and order) of 25 GHz ($3^{rd}$) and 30 GHz ($2^{nd}$), respectively. In turn, the optical signals are combined by an optical multiplexer (MUX) and are transmitted over a very short optical fiber (sub 2 km), such that it may be treated as an optical back-to-back transmission. At the receiver side, the optical signal is demultiplexed (via an optical DEMUX) followed by a variable optical attenuator (VOA) and each of the optical channels is detected by an optical to electrical converter (OEC). The OEC consists of a photodiode with responsivity of 0.7 [A/W] and trans-impedance amplifier (TIA) including automatic gain control (AGC). The noise source following the photodiode is assumed to obey an additive white Gaussian noise (AWGN) model with zero mean and 14 [pA/√Hz]. The electrical noised signal is filtered by the OEC's blocks. Each of the OEC's blocks, i.e., photodiode and TIA, has a Butterworth filter response with frequency cutoff (and order) of 30 GHz ($2^{nd}$), and 25 GHz ($3^{rd}$). The filtered data is transmitted over CP-MS with parameters identical to those of the CP-MS in the transmitter side. At the CP-MS output, each of the two electrical signals is sampled by an analog to digital converter (ADC) with sampling rate of 50 G samples/sec and an effective number of bits (ENOB) of 5 bits. The ADC has a Butterworth filter response with cutoff frequency (and order) of 17 GHz ($3^{rd}$). Finally, the sampled signal is post-processed by the DSP block, which compensates for the entire CP-MS traces (both In the transmitter- and receiver-side), and decoded. As this is intensity modulation and direct-detection (IM\DD) scheme, it preserved the linear relationship between the electrical modulated signal at the transmitter input and the electrical signal at the receiver output.

An inclusive set of Monte-Carlo simulations was performed, and the different compensation techniques were analyzed and compared. In the simulation, the entire channel modelling including the optoelectronic components, and the electrical traces is based on the analytical models that are presented above. The optical channel is modelled as back-to-back transmission. The parameters being used in the optoelectronic models are based on off-the-shelf components, e.g., ENOB and bandwidth. The analysis includes the following compensating techniques: (a) EECC (exact electrical coupling compensation), which is defined In equations (27)-(30), (b) 3ECC (enhanced exact electrical coupling compensation), which is defined further herein below, and (c) SF-ECC (spectrally fragmented electrical coupling compensation), which is defined in equations (31)-(37). All these compensation techniques are compared to the classical-XTC and an enhanced version of it (EXTC), which is defined further herein below. All the compensation filters are implemented in the frequency domain following a 50G samples/sec ADC. The data stream includes two cases of 25 Gbaud and 50 Gbaud, with 2-samples-per-symbol (SPS) and 1-SPS, respectively. This 2-SPS and 1-SPS frequency-domain equalization is equivalent to T/2 and T spaced time-domain FIR equalizer, respectively.

Figure 8A:
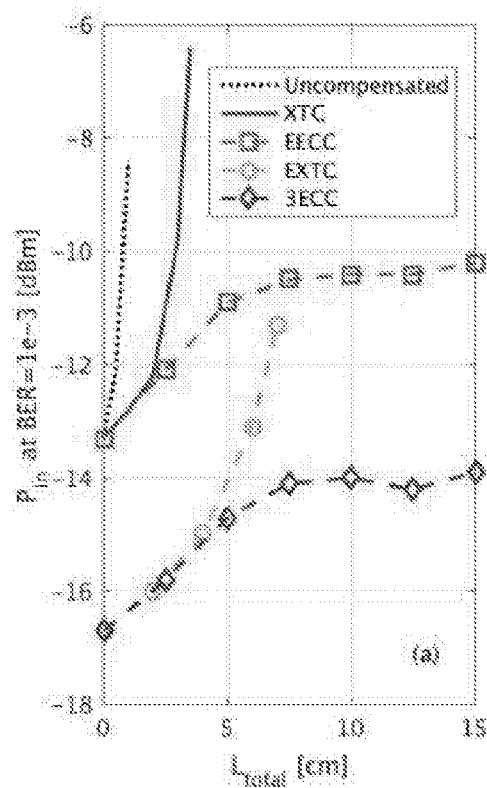
FIG. 8(a), FIG. 8(b), and FIG. 8(c) show graphs of minimum required received optical power vs. total CP-MS length values for the prior art crosstalk canceller and the coupling impairments canceller of the invention.
Figure 8B:
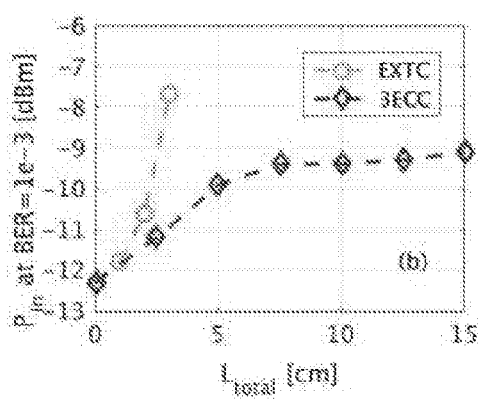
Figure 8C:
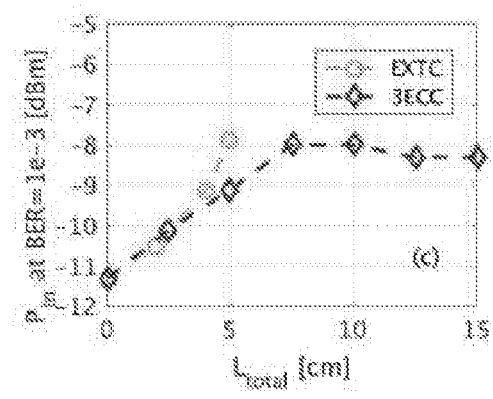

The performance of the EECC method of the invention versus "classical-XTC" is analyzed by means of the minimum required received optical power, which is denoted as $P_{in}$, to achieve pre-forward error correction (pre-FEC) bit error rate (BER) value of $10^{-3}$. This BER value is achieved by selecting the appropriate optical power, which is tuned by the VOA. The $P_{in}$ is measured for various total CP-MS length values $L_{total}$=2L (including both portions at the transmitter and receiver) and the results are summarized in FIG. 8(a)-8(c). FIG. 8(a) depicts the results for the 25 Gbaud OOK, where each of the curves represents a different compensation technique. In addition, the uncompensated data Is shown by the "dotted-curve". The compensation of the coupling impairments by the "classical-XTC" and EECC are shown by the "continuous-curve" and "squares-curve", respectively. It can be observed that the "classical-XTC" slightly improves the system performance as compared to the uncompensated data. Yet, the XTC is limited to very short traces (heading a brick wall at 3 cm). On the other hand, the EECC method of the invention improves the system performance and supports significantly longer CP-MS.

Figure 9:
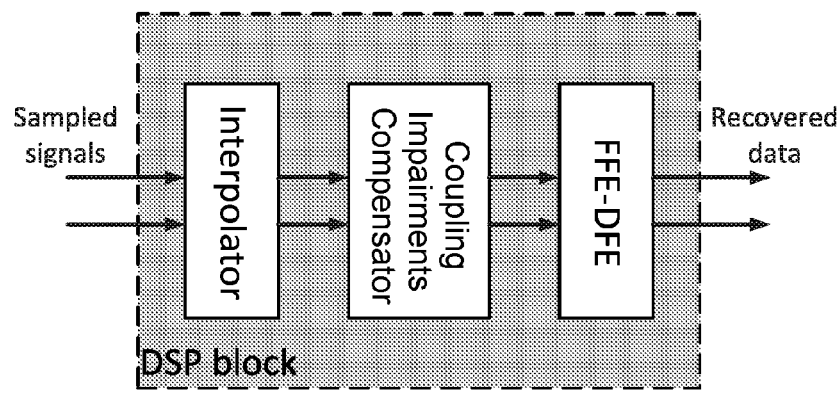
FIG. 9 schematically shows an extended DSP block for a CP-MS channel.

In contrast to multiple input multiple output (MIMO) channels with random coupling impairments, such as PMD in optical fiber, that are inherently limited by the channel approximation, and are compensated by stochastic equalization, e.g., maximum likelihood sequence estimation (MLSE), here the coupling compensation techniques of the invention are pure fixed and deterministic compensation for the deterministic coupling impairments of the CP-MS, which is similar to the compensation of chromatic dispersion in optical fiber. However, the intersymbol interference (ISI) that is introduced by the limited bandwidth of the DAC and the ADC is not compensated. Therefore, in order to mitigate the combined coupling impairments of the CP-MS and ISI distortions associated with the bandlimited components, the DSP engine at the receiver side Is extended and comprises an additional interpolator followed by a feed-forward equalizer and decision feedback equalizer (FFE-DFE). The extended DSP block is shown in FIG. 9, where the coupling impairments compensator can be realized either by XTC or by EECC. Depending on the coupling Impairments compensator, the extended DSP is denoted as enhanced XTC (EXTC) or enhanced EECC (3ECC). The interpolator retrieves the optimal time-domain sampling phase and the FFE-DFE adaptively mitigates the ISI penalty by using the least mean square (LMS) algorithm. In FIG. 8(a), the compensation of coupling Impairments by XTC or ECC, are compared with the EXTC and 3ECC. The performance analysis of 25 Gbaud OOK by using EXTC and 3ECC is presented by the "circles-curve" and "diamonds-curve", respectively. For all CP-MS lengths, the performances of EXTC and 3ECC are significantly Improved as compare to the XTC and EECC techniques. The results indicate that the EXTC technique supports longer $L_{total}$ values than the XTC, yet it supports significantly shorter traces lengths as compared to the 3ECC technique.

Additionally, the extended DSP engine is used for analyzing two 50 Gbit/sec systems, while the systems' hardware elements remain the same: (1) a 50 Gbaud OOK system, where the transmitted data rate is doubled, and (2) a 25 Gbaud optical 4-ary pulse amplitude modulation (PAM4). The results are summarized in FIG. 8(b) and FIG. 8(c), respectively. The curves Indicate that the proposed 3ECC improves the system performance and supports significantly longer CP-MS, while the EXTC is heading towards a "brick wall" after relatively short length of a few cm.

Figure 10A:
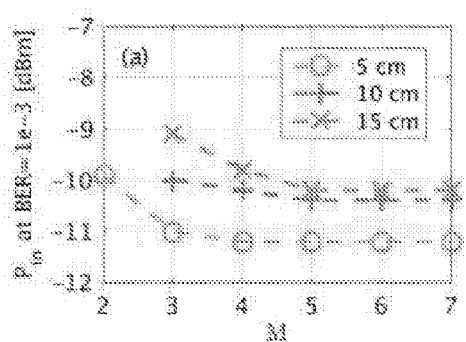
FIG. 10a shows graphs of power in ($P_{in}$) vs. fragmentation order M using the DSP compensation technique on a 25 Gbaud on-off key (OOK) optoelectronic system for different CP-MS lengths.

Furthermore, the SF-ECC technique is analyzed. The sampled signal is compensated by the DSP block that consists of the frequency-domain SF-ECC, while the other system components remain the same. The impact of the fragmentation order M on the 25 Gbaud OOK is studied and the results are summarized in FIG. 10(a), where each curve represents a different total CP-MS length $L_{total}$, and the back-to-back scenario is denoted as $L_{total}$=0. As the number of fragmented bands M Increases, the required $P_{in}$ decreases, indicating the improvement introduced by the frequency-domain SF-ECC. The optimal value of M, which is associated with the knee point of the $P_{in}$ curves, indicates the number of required sub-bands of the frequency-domain equalizer in (27) or equivalently the number of parallel filter-bank equalizers in (31). The best improvement is achieved with M=5 and essentially for M>5 the performance of the SF-ECC is identical to the performance of the EECC that is shown in FIG. 8(a) by the "squares-curve".

Figure 10C:
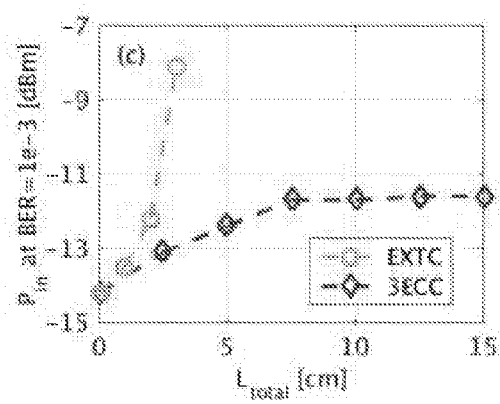
FIG. 10b, FIG. 10c, and FIG. 10d show graphs of power in ($P_{in}$) vs. fragmentation order M using different compensation techniques on 25 Gbaud OOK, 50 Gbaud OOK, and 25 Gbaud OPAM4 optoelectronic systems respectively.
Figure 10B:
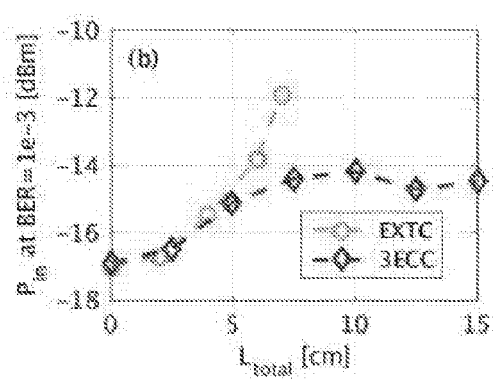
Figure 10D:
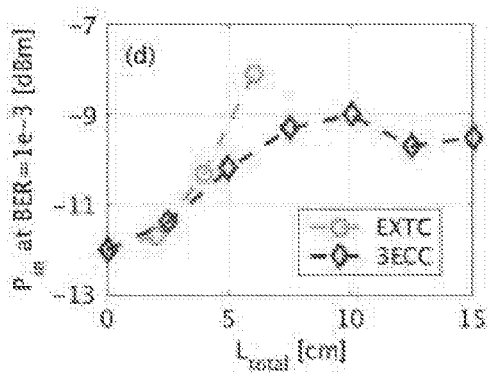

Finally, the new generation of wide band optics (25-30G), e.g., silicon photonics based components, that leads to overall channel bandwidth of 25 GHz and above is considered. Therefore, the frequency responses of the DAC, EOC, OEC and ADC are modelled by an equivalent frequency response, which obeys a Butterworth filter with an overall frequency cutoff of 25 GHz and order of 6 and 3 for the signal and noise, respectively. The other system parameters remain the same and the DSP block consists of EXTC or 3ECC. The analysis results of 25 Gbaud OOK, 50 Gbaud OOK, and 25 Gbaud OPAM4 are presented in FIG. 10(b)-(d), respectively. The "circles-curves" and "diamonds-curves" stand for the EXTC and 3ECC techniques, respectively. For all CP-MS lengths, the $P_{in}$ performances of EXTC and 3ECC are improved as compare to the performance in FIG. 8. Yet, the 3ECC technique supports significantly longer $L_{total}$ values as compared to the EXTC.

To summarize all of the above, an exact coupling model of CP-MS was developed and revealed that for ultra-broadband communication links (25G and above) the XTC's coupling model is not valid. Therefore, the classical-XTC technique is limited to sub-10G transmission or short microstrip length. On the other hand, the compensation techniques of the current invention, i.e., EECC, 3ECC and SF-ECC, which are based on the exact coupling model, support longer traces length. In the case of 100G PAM4 transmission and by using commercially available 25G components, the new 3ECC technique supports microstrip traces of 15 cm, while EXTC Is limited to 5 cm. Additionally, the new generation of silicon photonics components is considered herein and it is shown that even in this case the new 3ECC technique supports significantly longer microstrip traces compared to EXTC.

The EECC algorithm, which is described by equations (23) can be utilized for coupled multiple transmission lines (more than two lines) by using the exact Inverse matrix sampled coupling transfer function of the coupled multiple transmission lines. Similarly, the SF-ECC algorithm, which is described by (30), can be utilized for coupled multiple transmission lines by using the approximated frequency-domain transfer function of the coupled multiple transmission lines, which is the approximation of the exact inverse matrix sampled coupling transfer function of the coupled multiple transmission lines, or by using the approximated time-domain impulse response of coupled multiple transmission lines. The exact coupling transfer function matrix of specific coupled multiple transmission lines can be calculated, simulated or measured, and then be used for the derivation of the exact inverse matrix sampled coupling transfer function, the approximated frequency-domain transfer function, and the approximated time-domain impulse response of the coupled multiple transmission lines. This derivation is similar to the derivation of the transfer function and impulse response matrix that have been demonstrated herein above for the EECC and SF-ECC of CP-MS. Additionally, the DSP engine at the receiver side can be extended and consists of additional interpolator followed by FFE-DFE, in order to compensate for the ISI. The extended block is shown in FIG. 9, where the coupling impairments compensation can be realized by either the EECC or the SF-ECC of coupled (pair or multiple) transmission lines.

The invention is Implemented by different embodiments of DSP chips that are designed to realize one or more of the algorithms of the invention. The exact design of the DSP chip is dependent on the application. Hence the DSP chip Is sometimes defined as an application-specific integrated circuit (ASIC) DSP chip. Each of the coupling impairments compensation algorithms in this invention is realized by a DSP chip. The DSP chip can be different for each algorithm or generic for more than one of the algorithms with the option of selecting between them, or part of a DSP chip that performs additional digital signal processing tasks. Hence, the DSP chips comprise a coupling impairments compensator that can be realized by each of the coupling impairment compensation algorithms of this invention i.e., EECC (equations (23)-(24)), time-domain SF-ECC (equations (31)-(37)), frequency-domain SF-ECC (equations (27)-(30)) for pair (or multiple) coupled microstrips. The coupling impairments compensator can be used for either pre-compensation or for post-compensation of the coupling impairments as will be discussed herein below. Additionally, the OSP block can be extended as described herein above in order to compensate for the intersymbol interference (ISI) in which case, the block diagram of FIG. 9 is used for post-compensation (3ECC).

Figure 11:
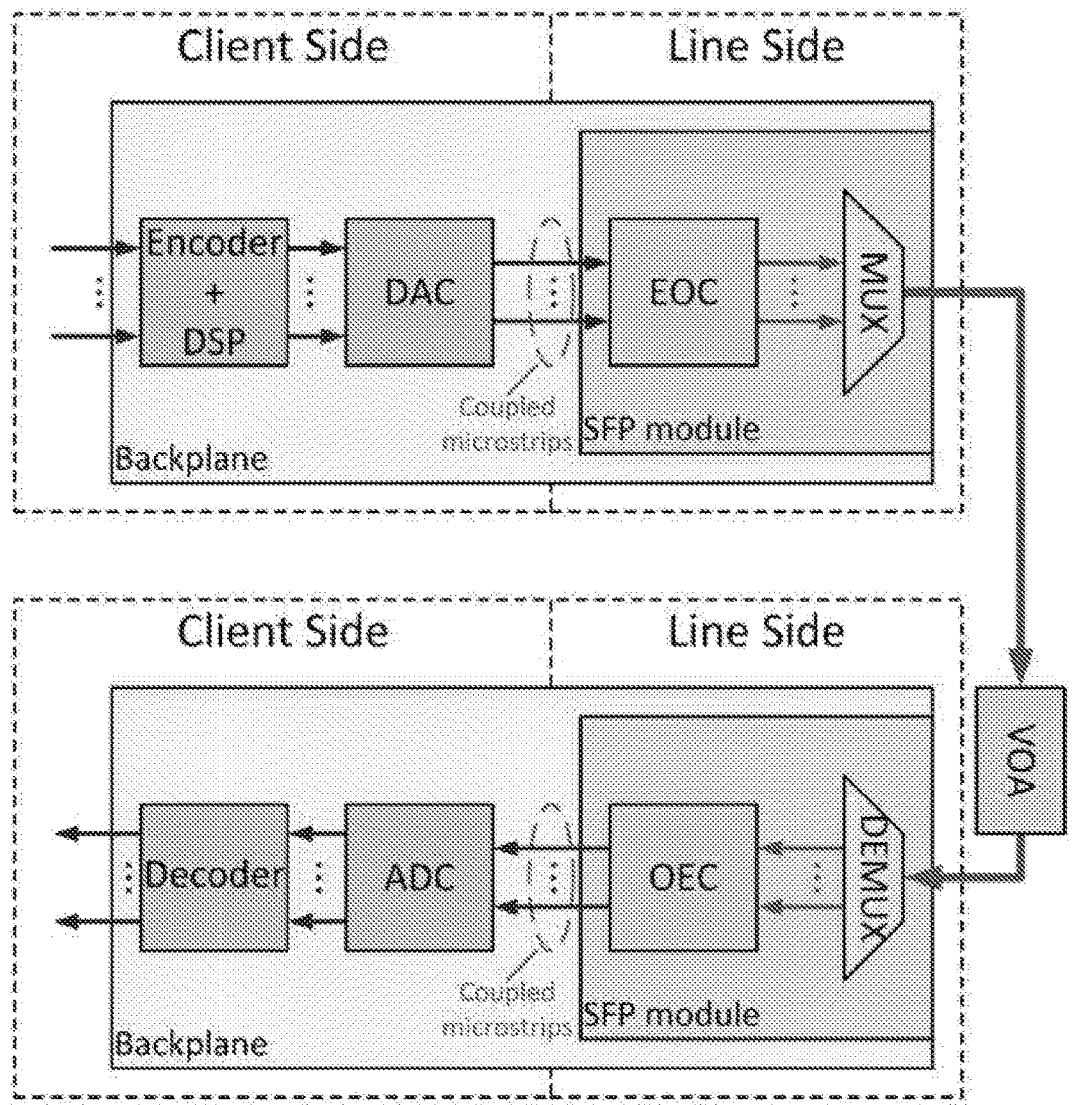
FIG. 11 shows a system block with a coupling impairments pre-compensator implemented by a DSP unit at the transmitter side.
Figure 12:
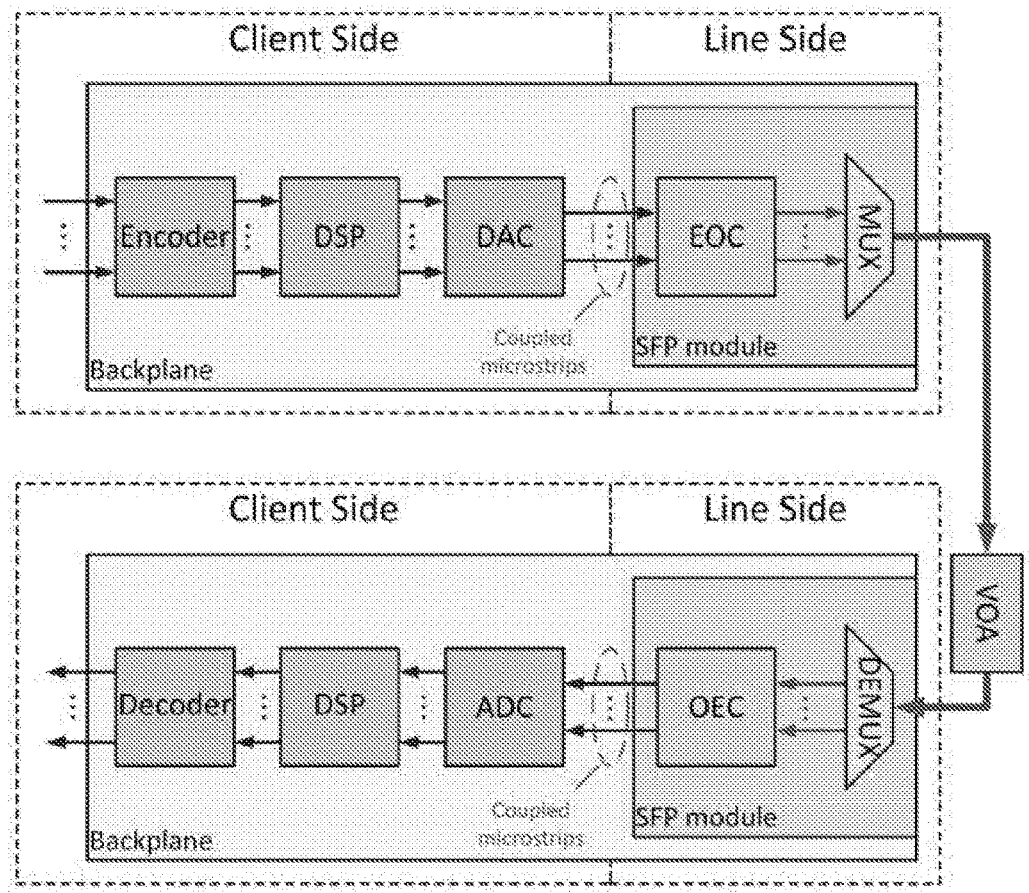
FIG. 12 shows a system block with a coupling impairments pre-compensator implemented by a DSP unit as in FIG. 11, at the transmitter side additionally comprising a DSP unit at the receiver side in order to compensate for the intersymbol interference (ISI)

Algorithms of the invention can be implemented either for pre-compensation, i.e. on the transmitter side of the transmission system, as shown in FIG. 11, or for post-compensation, i.e. on the receiver side, as shown in FIG. 7, or on both transmitter and receiver sides as shown In FIG. 12.

FIG. 11 shows a system block with a coupling impairments pre-compensator implemented by a DSP unit at the transmitter side. The DSP chip comprises a coupling impairments compensator that is realized by either the EECC or the SF-ECC compensation algorithm of the invention for coupled (pair or multiple) transmission lines.

Figure 13:
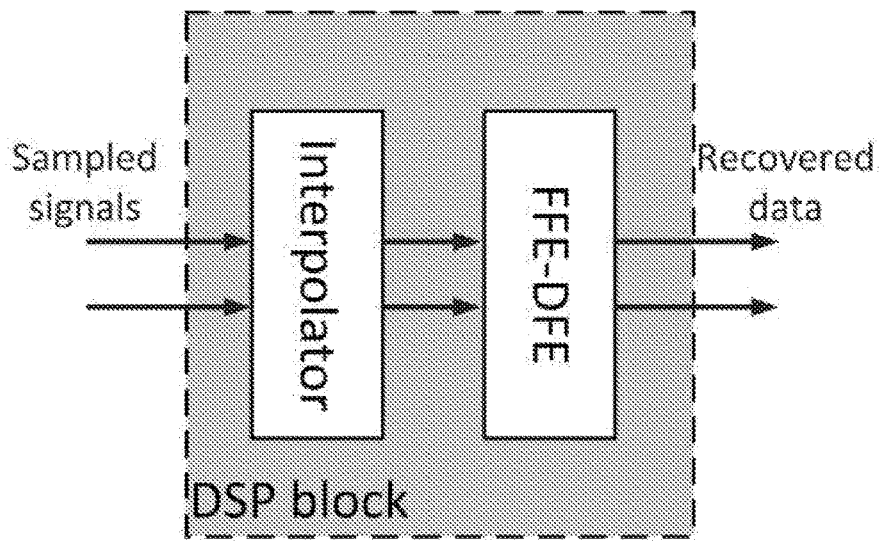
FIG. 13 shows the DSP unit at the receiver side of the system of FIG. 12.

FIG. 12 shows a system block with a coupling Impairments pre-compensator implemented by a DSP unit as in FIG. 11, at the transmitter side additionally comprising a DSP engine, which comprises a coupling impairments compensator that is realized by either the EECC or the SF-ECC compensation algorithm of the invention for coupled (pair or multiple) transmission lines and an interpolator followed by FFE-DFE (as shown in FIG. 13), which is added at the receiver side in order to compensate for the ISI.

Although embodiments of the invention have been described by way of illustration, it will be understood that the invention may be carried out with many variations, modifications, and adaptations, without exceeding the scope of the claims.

APPENDIX

The derivation of (32) is:

$$\tilde{h}_{IL}^{(MS)(k)}(t) = \mathfrak{J}^{-1}\{\tilde{H}_{IL}^{(MS)}(j\omega)\} \quad (41)$$

$$= \frac{1}{2\pi}\int_{-\infty}^{\infty}\tilde{H}_{IL}^{(MS)}(j\omega)e^{j\omega t}d\omega$$

$$= \frac{1}{2\pi}\sum_{k=1}^{M}\int_{\omega_0^{(k)}-\frac{B_M}{2}}^{\omega_0^{(k)}+\frac{B_M}{2}}\tilde{H}_{IL}^{(MS)}(j\omega)e^{j\omega t}d\omega$$

$$= \frac{1}{2\pi}\sum_{k=1}^{M}\int_{-\infty}^{\infty}\tilde{H}_{IL}^{(MS)}(j\omega)\Pi(j\omega - j\omega_0^{(k)})e^{j\omega t}d\omega$$

$$= \sum_{k=1}^{M}\mathfrak{J}^{-1}\{\tilde{H}_{IL}^{(MS)(k)}(j\omega)\}$$

$$= \sum_{k=1}^{M}\tilde{h}_{IL}^{(MS)(k)}(t)$$

where $\tilde{H}_{IL}^{(MS)(k)}(j\omega)$ is the IL of CP-MS within the $k^{th}$ IL sub-band, $\tilde{h}_{IL}^{(MS)(k)}(t)$ is the impulse response of the IL of CP-MS within the $k^{th}$ sub-band, $\Pi$ is the rectangular function, which defined as:

$$\Pi(j\omega) = \begin{cases} 0, & |\omega| > \frac{B_M}{2} \\ 1, & |\omega| \leq \frac{B_M}{2} \end{cases} \quad (42)$$

and the impulse response of $\Pi$ is;

$$\mathfrak{J}^{-1}\{\Pi(j\omega)\} = \frac{1}{\pi t}\sin\left(\frac{B_M}{2}t\right) = \frac{B_M}{2\pi}\operatorname{sinc}\left(\frac{B_M}{2}t\right). \quad (43)$$

Note that a similar approach is taken in the calculation of the impulse response of the $\tilde{H}_{FEXT}^{(MS)}(j\omega)$.

BIBLIOGRAPHY

[1] F. D. Mbairi, W. P. Siebert, and H. Hesselbom, "High-Frequency Transmission Lines Crosstalk Reduction Using Spacing Rules," *IEEE Transactions on Components and Packaging Technologies*, vol. 31, no. 3, pp. 601-610, September 2008.
[2] K. Prachumrasee, A. Kaewrawang, A. Kruesubthaworn, R. Sivaratana, and A. Siritaratiwat, "Crosstalk Suppression in High Data Rate and High Density Hard Disk Drive Interconnects Using Magnetic Composites," *Frequenz*, vol. 67, no. 7-8, January 2013.
[3] T. Oh and R. Harjani, "A 12-Gb/s Multichannel I/O Using MIMO Crosstalk Cancellation and Signal Reutilization in 65-nm CMOS," *IEEE Journal of Solid-State Circuits*, vol. 48, no. 6, pp. 1383-1397, June 2013.
[4] C. Pelard et al., "Realization of multigigabit channel equalization and crosstalk cancellation integrated circuits," in *IEEE Journal of Solid-State Circuits*, vol. 39, no. 10, pp. 1659-1670, October 2004.

[5] S.-Y. Kao and S.-I. Liu, "A 10-Gb/s Adaptive Parallel Receiver With Joint XTC and DFE Using Power Detection," *IEEE Journal of Solid-State Circuits*, vol. 48, no. 11, pp. 2815-2826, November 2013.

[6] J. Han and M. M. Green, "A 2×50-Gb/s receiver with adaptive channel loss equalization and far-end crosstalk cancellation," 2015, pp. 2397-2400.

[7] R. Mongia, I. J. Bahl, P. Bhartia, and J. Hong, *RF and microwave coupled-line circuits*, 2nd ed. Boston: Artech House, 2007.

[8] D. M. Pozar, *Microwave engineering*, 4th ed. Hoboken, N.J.: Wiley, 2012.

[9] G. P. Agrawal, *Nonlinear fiber optics*, Fourth edition. Amsterdam: Elsevier/Academic Press, 2007, pages 8-13, 213-215, 376.

[10] D. Penninckx and V. Morénas, "Jones matrix of polarization mode dispersion," *Optics Letters*, vol. 24, no. 13, p. 875, July 1999.

[11] H. A. Atwater, "Tests of microstrip dispersion formulas," *IEEE Transactions on Microwave Theory and Techniques*, vol. 36, no. 3, pp. 619-621, March 1988.

[12] Y. London and D. Sadot, "Spectrally Fragmented Electrical Dispersion Compensation for High-Speed Microstrip Traces In Data Centers Connections," in *IEEE Photonics Journal*, vol. 8, no. 2, pp. 1-12, April 2016.

[13] M. Kirschning and R. H. Jansen, "Accurate Wide-Range Design Equations for the Frequency-Dependent Characteristic of Parallel Coupled Microstrip Lines," *IEEE Transactions on Microwave Theory and Techniques*, vol. 32, no. 1, pp. 83-90, January 1984.

[14] R. Mellitz and K. Lusted, "100 Gb/s Backplane/PCB Ethernet Two Channel Model and Two PHY Proposal," Proc. IEEE P802.3bj TF, January 2012.

[15] A. C. Scogna, "Signal integrity analysis of a 26 layers board with emphasis on the effect of non-functional pads," In Proc. of IEEE Int. Symposium on EMC, August 2008.

[16] T. Oh and R. Harjani, "A 6-Gb/s MIMO Crosstalk Cancellation Scheme for High-Speed I/Os," *IEEE Journal of Solid-State Circuits*, vol. 46, no. 8, pp. 1843-1856, August 2011.

[17] Y. London and D. Sadot, "Digital Compensation for Coupling Impairments of Coupled Traces in 100G PAM4 Data Center Connections," in *Proc. of the conference Signal Processing in Photonic Communications* 2016, Vancouver Canada, 18-20 Jul. 2016, ISBN: 978-1-943580-14-9, From the session *Short Range Links (SpM2E)*.

[18] Y. London and D. Sadot, "Inclusive Modeling and Digital Compensation for Coupling Impairments of High-Speed Coupled Electrical Microstrip Traces in 100G OOK and PAM4 Data Center Connections," in Journal of Lightwave Technology, vol. 34, no. 23, pp. 5474-5484, Dec. 1, 1 2016, doi: 10.1109/JLT.2016.2602881.

The invention claimed is:

1. A digital signal processing (DSP) unit for an ultra-broadband optoelectronic system comprising two or more coupled pair-microstrip (CP-MS) traces, the DSP unit comprising an electronic circuit configured to realize at least one of an EECC algorithm, a frequency-domain SF-ECC algorithm, and a time-domain SF-ECC algorithm;
  the DSP characterized in that:
  a) the EECC algorithm is:

$$\underline{v}_n^{(EECC)} = IDTFT\left\{\hat{H}_{MS}^{-1}(j\omega') \cdot DTFT\left\{[h_{MS}(t) * v_{in}(t,0)]\big|_{t=\frac{nT_s}{SPS}}\right\}\right\}$$

wherein
  $\underline{v}_n^{(EECC)}$ is the compensated digital signal vector, n is the sampling index,
  DTFT stands for the discrete-time Fourier transform,
  IDTFT is the inverse DTFT,
  $V_{in}(t,0)$ is the time-domain injected ultra-broadband electrical signal column vector at the CP-MS inputs,
  $h_{ms}(t)$ is the coupling impulse response matrix $\mathfrak{I}^{-1}\{H_{MS}(j\omega)\}$,
  $\mathfrak{I}$ stands for the Fourier transform,
  $T_s$ is the sampling period,
  SPS is the number of samples-per-symbol,
  * denotes the convolution operation,
  $\hat{H}_{MS}^{-1}(j\omega')$ is the inverse matrix of the sampled coupling transfer function,
  $\omega' \in [-\omega_s/2, \omega_s/2]$ is the digital angular frequency, and
  $\omega_s$ is the angular sampling frequency that follows the sampling frequency $f_s$ of the analog to digital (ADC), which is related to the sampling period by $T_s = 2\pi/\omega_s$; and
b) the frequency domain SF-ECC algorithm is:

$$\underline{v}_n^{(SF-ECC)} = IDTFT\left\{\tilde{H}_{MS}^{-1}(j\omega) \cdot DTFT\left\{[h_{MS}(t) * v_{in}(t,0)]\big|_{t=\frac{nT_s}{SPS}}\right\}\right\};$$

wherein the DSP unit is extended to compensate for intersymbol interference (ISI) by addition of an interpolator and a feed-forward equalizer and decision-feedback equalizer (FFE-DFE).

2. The DSP of claim 1, wherein the inverse matrix of the sampled coupling transfer function is:

$$\hat{H}_{MS}^{-1}(j\omega') = \begin{bmatrix} \cos(\omega'\Delta\tau_{MS}(\omega')) & j\sin(\omega'\Delta\tau_{MS}(\omega')) \\ j\sin(\omega'\Delta\tau_{MS}(\omega')) & \cos(\omega'\Delta\tau_{MS}(\omega')) \end{bmatrix}.$$

3. The DSP of claim 1, wherein the frequency-domain SF-ECC algorithm comprises:

$$\tilde{H}_{MS}^{-1}(j\omega) = \begin{bmatrix} \tilde{H}_{IL}^{(MS)}(j\omega) & -\tilde{H}_{FEXT}^{(MS)}(j\omega) \\ -\tilde{H}_{FEXT}^{(MS)}(j\omega) & \tilde{H}_{IL}^{(MS)}(j\omega) \end{bmatrix} \text{ where,}$$

$$\tilde{H}_{IL}^{(MS)}(j\omega) = \cos\left(\omega\sum_{k=1}^{M}\Delta\tau_{MS}^{(k)}(\omega)\right) \text{ and}$$

$$\tilde{H}_{FEXT}^{(MS)}(j\omega) = -j\sin\left(\omega\sum_{k=1}^{M}\Delta\tau_{MS}^{(k)}(\omega)\right)$$

and the compensated digital signal vector is:

$$\underline{v}_n^{(SF-ECC)} = IDTFT\left\{\tilde{H}_{MS}^{-1}(j\omega) \cdot DTFT\left\{[h_{MS}(t) * v_{in}(t,0)]\big|_{t=\frac{nT_s}{SPS}}\right\}\right\}.$$

4. The DSP of claim 1, wherein the time-domain SF-ECC algorithm comprises:

$$\tilde{h}_{MS}^{-1}(t) = \begin{bmatrix} \tilde{h}_{IL}^{(MS)}(t) & -\tilde{h}_{FEXT}^{(MS)}(t) \\ -\tilde{h}_{FEXT}^{(MS)}(t) & \tilde{h}_{IL}^{(MS)}(t) \end{bmatrix}$$

where $$\tilde{h}_{IL}^{(MS)}(t) = \mathcal{F}^{-1}\{\tilde{H}_{IL}^{(MS)}(j\omega)\},$$
$$= \sum_{k=1}^{M} \tilde{h}_{IL}^{(MS)(k)}(t)$$

$$\tilde{h}_{FEXT}^{(MS)}(t) = \mathcal{F}^{-1}\{\tilde{H}_{FEXT}^{(MS)}(j\omega)\},$$
$$= \sum_{k=1}^{M} \tilde{h}_{FEXT}^{(MS)(k)}(t)$$

$$\tilde{h}_{IL}^{(MS)(k)}(t) = \mathcal{F}^{-1}\{\tilde{H}_{FEXT}^{(MS)}(j\omega)\}$$
$$= \frac{1}{2\pi}\int_{-\infty}^{\infty}\cos(\omega\Delta\tau_{MS}(\omega))\Pi(j\omega - j\omega_0^{(k)})e^{j\omega t}d\omega$$
$$\cong \frac{1}{2\pi}\int_{-\infty}^{\infty}\cos(\omega\Delta\tau_{MS(I)}^{(k)}(\omega))\Pi(j\omega - j\omega_0^{(k)})e^{j\omega t}d\omega$$
$$= \frac{1}{4\pi}\int_{-\infty}^{\infty}e^{j\omega(\Delta\tau_{MS_0}^{(k)} - \omega_0^{(k)}\Delta\tau_{MS_1}^{(k)}) + j\omega^2\Delta\tau_{MS_1}^{(k)}}\Pi(j\omega - j\omega_0^{(k)})e^{j\omega t}d\omega +$$
$$\frac{1}{4\pi}\int_{-\infty}^{\infty}e^{j\omega(\Delta\tau_{MS_0}^{(k)} - \omega_0^{(k)}\Delta\tau_{MS_1}^{(k)}) + j\omega^2\Delta\tau_{MS_1}^{(k)}}\Pi(j\omega - j\omega_0^{(k)})e^{j\omega t}d\omega$$
$$= A \cdot \begin{bmatrix} \sqrt{j}e^{-j\vartheta^{(k)}(t)} * \delta(t+\gamma^{(k)}) + \\ \sqrt{-j}e^{j\vartheta^{(k)}(t)} * \delta(t+\gamma^{(k)}) \end{bmatrix} * \operatorname{sinc}\left(\frac{B_M}{2}t\right)e^{j\omega_0^{(k)}t}$$

and $$\tilde{h}_{FEXT}^{(MS)(k)}(t) \cong A \cdot \begin{bmatrix} \sqrt{j}e^{-j\vartheta^{(k)}(t)} * \delta(t+\gamma^{(k)}) + \\ \sqrt{-j}e^{j\vartheta^{(k)}(t)} * \delta(t+\gamma^{(k)}) \end{bmatrix} * \operatorname{sinc}\left(\frac{B_M}{2}t\right)e^{j\omega_0^{(k)}t}$$

and the compensated digital signal vector is:

$$\underline{v}_n^{(SF-ECC)} = \left\{\tilde{h}_{MS}^{-1}(t) * \left\{[h_{MS}(t) * v_{in}(t,0)]_{|t=\frac{n\cdot T_s}{SPS}}\right\}\right\}.$$

5. The DSP of claim 1, wherein the EECC algorithm can be utilized for coupled multiple transmission lines by using the exact inverse matrix sampled coupling transfer function of the coupled multiple transmission lines.

6. The DSP of claim 1, wherein the SF-ECC algorithm can be utilized for coupled multiple transmission lines by using the approximated frequency-domain transfer function of the coupled multiple transmission lines or by using the approximated time-domain impulse response of coupled multiple transmission lines.

7. An ultra-broadband optoelectronic system comprising two or more coupled pair-microstrip (CP-MS) traces and a digital signal processing (DSP) unit comprising an electronic circuit configured to compensate for coupling impairments by realizing at least one of an exact electrical coupling impairments compensation (EECC) algorithm and a spectrally fragmented electrical coupling compensation (SF-ECC) algorithm, wherein the SF-ECC can be used for compensation of coupling impairments in the frequency domain by a frequency-domain SF-ECC algorithm, and in the time domain by a time-domain SF-ECC algorithm; the system characterized in that:

a) the EECC algorithm comprises:

$$\underline{v}_n^{(EECC)} = IDTFT\left\{\hat{H}_{MS}^{-1}(j\omega') \cdot DTFT\left\{[h_{MS}(t) * v_{in}(t,0)]_{|t=\frac{n\cdot T_s}{SPS}}\right\}\right\}$$

wherein $\underline{v}_n^{(EECC)}$ is the compensated digital signal vector, n is the sampling index, DTFT stands for the discrete-time Fourier transform, IDTFT is the inverse DTFT, $V_{in}(t,0)$ is the time-domain injected ultra-broadband electrical signal column vector at the CP-MS inputs, $h_{ms}(t)$ is the coupling impulse response matrix $\mathfrak{F}^{-1}\{H_{MS}(j\omega)\}$, $\mathfrak{F}$ stands for the Fourier transform, $T_s$ is the sampling period, SPS is the number of samples-per-symbol,

* denotes the convolution operation, $\hat{H}_{MS}^{-1}(j\omega')$ is the inverse matrix of the sampled coupling transfer function, $\omega' \in [-\omega_s/2, \omega_s/2]$ is the digital angular frequency, and $\omega_s$ is the angular sampling frequency that follows the sampling frequency $f_s$ of the analog to digital (ADC), which is related to the sampling period by $T_s = 2\pi/\omega_s$; and b) the frequency domain SF-ECC algorithm is:

$$\underline{v}_n^{(SF-ECC)} = IDTFT\left\{\tilde{H}_{MS}^{-1}(j\omega) \cdot DTFT\left\{[h_{MS}(t) * v_{in}(t,0)]_{|t=\frac{n\cdot T_s}{SPS}}\right\}\right\};$$

wherein the DSP unit is located at one of:

a) the transmitter side of the optoelectronic system for pre-compensation implementation of the coupling impairments by the EECC or SF-ECC algorithms; and b) the receiver side of the optoelectronic system for post-compensation implementation of the coupling impairments by the EECC or SF-ECC algorithms.

8. The system of claim 7, wherein the inverse matrix of the sampled coupling transfer function is:

$$\hat{H}_{MS}^{-1}(j\omega') = \begin{bmatrix} \cos(\omega'\Delta\tau_{MS}(\omega')) & j\sin(\omega'\Delta\tau_{MS}(\omega')) \\ j\sin(\omega'\Delta\tau_{MS}(\omega')) & \cos(\omega'\Delta\tau_{MS}(\omega')) \end{bmatrix}.$$

9. The system of claim 7, wherein the frequency-domain SF-ECC algorithm comprises:

$$\tilde{H}_{MS}^{-1}(j\omega) = \begin{bmatrix} \tilde{H}_{IL}^{(MS)}(j\omega) & -\tilde{H}_{FEXT}^{(MS)}(j\omega) \\ -\tilde{H}_{FEXT}^{(MS)}(j\omega) & \tilde{H}_{IL}^{(MS)}(j\omega) \end{bmatrix}$$

where, $$\tilde{H}_{IL}^{(MS)}(j\omega) = \cos\left(\omega\sum_{k=1}^{M}\Delta t_{MS}^{(k)}(\omega)\right) \text{ and}$$

$$\tilde{H}_{FEXT}^{(MS)}(j\omega) = -j\sin\left(\omega\sum_{k=1}^{M}\Delta t_{MS}^{(k)}(\omega)\right)$$

and the compensated digital signal vector is:

$$\underline{v}_n^{(SF-ECC)} = IDTFT\left\{\tilde{H}_{MS}^{-1}(j\omega) \cdot DTFT\left\{[h_{MS}(t) * v_{in}(t,0)]\big|_{t=\frac{n \cdot T_s}{SPS}}\right\}\right\}.$$

10. The system of claim 7, wherein the time-domain SF-ECC algorithm comprises:

$$\tilde{h}_{MS}^{-1}(t) = \begin{bmatrix} \tilde{h}_{IL}^{(MS)}(t) & -\tilde{h}_{FEXT}^{(MS)}(t) \\ -\tilde{h}_{FEXT}^{(MS)}(t) & \tilde{h}_{IL}^{(MS)}(t) \end{bmatrix}$$

where, $$\tilde{h}_{IL}^{(MS)}(t) = \mathfrak{J}^{-1}\{\tilde{H}_{IL}^{(MS)}(j\omega)\},$$
$$= \sum_{k=1}^{M} \tilde{h}_{IL}^{(MS)(k)}(t)$$

$$\tilde{h}_{FEXT}^{(MS)}(t) = \mathfrak{J}^{-1}\{\tilde{H}_{FEXT}^{(MS)}(j\omega)\},$$
$$= \sum_{k=1}^{M} \tilde{h}_{FEXT}^{(MS)(k)}(t)$$

$$\tilde{h}_{IL}^{(MS)(k)}(t) = \mathfrak{J}^{-1}\{\tilde{H}_{IL}^{(MS)(k)}(j\omega)\}$$
$$= \frac{1}{2\pi}\int_{-\infty}^{\infty}\cos(\omega\Delta\tau_{MS}(\omega))\Pi(j\omega-j\omega_0^{(k)})e^{j\omega t}d\omega$$
$$\cong \frac{1}{2\pi}\int_{-\infty}^{\infty}\cos(\omega\Delta\tau_{MS(I)}^{(k)}(\omega))\Pi(j\omega-j\omega_0^{(k)})e^{j\omega t}d\omega$$
$$= \frac{1}{4\pi}\int_{-\infty}^{\infty}e^{j\omega(\Delta\tau_{MS_0}^{(k)}-\omega_0^{(k)}\Delta\tau_{MS_1}^{(k)})+j\omega^2\Delta\tau_{MS_1}^{(k)}}\Pi(j\omega-j\omega_0^{(k)})e^{j\omega t}d\omega +$$
$$\frac{1}{4\pi}\int_{-\infty}^{\infty}e^{-j\omega(\Delta\tau_{MS_0}^{(k)}-\omega_0^{(k)}\Delta\tau_{MS_1}^{(k)})+j\omega^2\Delta\tau_{MS_1}^{(k)}}\Pi(j\omega-j\omega_0^{(k)})e^{j\omega t}d\omega$$
$$= A \cdot \begin{bmatrix} \sqrt{j}\, e^{-j\vartheta^{(k)}(t)} * \delta(t+\gamma^{(k)}) + \\ \sqrt{-j}\, e^{j\vartheta^{(k)}(t)} * \delta(t-\gamma^{(k)}) \end{bmatrix} * \text{sinc}\left(\frac{B_M}{2}t\right)e^{j\omega_0^{(k)}t}$$

and $$\tilde{h}_{FEXT}^{(MS)(k)}(t) \cong A \cdot \begin{bmatrix} \sqrt{j}\, e^{-j\vartheta^{(k)}(t)} * \delta(t+\gamma^{(k)}) + \\ \sqrt{-j}\, e^{j\vartheta^{(k)}(t)} * \delta(t-\gamma^{(k)}) \end{bmatrix} * \text{sinc}\left(\frac{B_M}{2}t\right)e^{j\omega_0^{(k)}t}$$

and the compensated digital signal vector is:

$$\underline{v}_n^{(SF-ECC)} = \left\{\tilde{h}_{MS}^{-1}(t) * \left\{[h_{MS}(t)*v_{in}(t,0)]\big|_{t=\frac{n\cdot T_s}{SPS}}\right\}\right\}.$$

11. The system of claim 7, wherein the EECC algorithm can be utilized for coupled multiple transmission lines by using the exact inverse matrix sampled coupling transfer function of the coupled multiple transmission lines.

12. The system of claim 7, wherein the SF-ECC algorithm can be utilized for coupled multiple transmission lines by using the approximated frequency-domain transfer function of the coupled multiple transmission lines or by using the approximated time-domain impulse response of coupled multiple transmission lines.

13. The system of claim 12, wherein one DSP unit is located at the transmitter side of the optoelectronic system for pre-compensation implementation of the coupling impairments by the EECC or SF-ECC algorithms and a second DSP unit comprising an interpolator and a FFE-DFE is located at the receiver side of the optoelectronic system.

14. The system of claim 7, wherein the DSP unit is extended to compensate for intersymbol interference (ISI) by addition of an interpolator and a feed-forward equalizer and decision feedback equalizer (FFE-DFE).

\* \* \* \* \*